(12) United States Patent
Kilgore et al.

(10) Patent No.: US 10,678,108 B2
(45) Date of Patent: Jun. 9, 2020

(54) ELECTROCHROMIC FILTERING IN A CAMERA

(71) Applicant: GOOGLE LLC, Mountain View, CA (US)

(72) Inventors: Adam Scott Kilgore, San Rafael, CA (US); Amber Luttmann Volmering, Newark, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/112,284

(22) Filed: Aug. 24, 2018

(65) Prior Publication Data
US 2018/0364538 A1 Dec. 20, 2018

Related U.S. Application Data

(63) Continuation of application No. 15/339,839, filed on Oct. 31, 2016, now Pat. No. 10,180,615.

(51) Int. Cl.
*G02F 1/155* (2006.01)
*G02F 1/1506* (2019.01)
(Continued)

(52) U.S. Cl.
CPC ............. *G02F 1/155* (2013.01); *G02B 5/208* (2013.01); *G02F 1/15* (2013.01); *G02F 1/1506* (2013.01);
(Continued)

(58) Field of Classification Search
CPC . G02F 1/155; G02F 1/15; G02F 1/157; G02F 1/163; G02F 1/1506;
(Continued)

(56) References Cited

U.S. PATENT DOCUMENTS 2,997,935 A 8/1961 Scheffold
3,782,260 A 1/1974 Ettischer et al.
(Continued)

FOREIGN PATENT DOCUMENTS

WO WO2005/034505 A1 4/2005

OTHER PUBLICATIONS

0308 Brand USB 2.0 HD Night Vision Webcam Web Cam Camera Webcamera With Microphone Sucker Stand for PC Computer Laptop Notebook, Dec. 18, 2015, 13 pgs.
(Continued)

*Primary Examiner* — James M Pontius
(74) *Attorney, Agent, or Firm* — Morgan, Lewis & Bockius LLP

(57) ABSTRACT

This application is directed to a lens assembly configured to focus light on a sensor array of an optical device. The lens assembly comprises one or more optical lenses and an electrochromic layer positioned between the one or more optical lenses and the sensor array. The electrochromic layer has one or more optical properties that are responsive to voltage applied to the layer, including a first optical property related to optical transmissivity. The first optical property includes a first state, responsive to a first applied voltage, in which the layer is substantially opaque to a predefined band of IR wavelengths. The first optical property also includes a second state, responsive to a second applied voltage distinct from the first applied voltage, in which the layer is substantially transparent to the predefined band of IR wavelengths and visible wavelengths.

18 Claims, 10 Drawing Sheets

(51) Int. Cl.
  *G02F 1/163* (2006.01)
  *G02F 1/157* (2006.01)
  *H04N 5/232* (2006.01)
  *H04N 5/33* (2006.01)
  *G06K 9/00* (2006.01)
  *H04N 5/225* (2006.01)
  *H04N 5/235* (2006.01)
  *G02F 1/15* (2019.01)
  *G02B 5/20* (2006.01)

(52) U.S. Cl.
  CPC .............. *G02F 1/157* (2013.01); *G02F 1/163* (2013.01); *G06K 9/00771* (2013.01); *H04N 5/2254* (2013.01); *H04N 5/2355* (2013.01); *H04N 5/2358* (2013.01); *H04N 5/23245* (2013.01); *H04N 5/332* (2013.01); *G02F 2001/1555* (2013.01)

(58) Field of Classification Search
  CPC ............ G02F 2001/1555; G02B 5/208; H04N 5/2254; H04N 5/2358; H04N 5/2355; H04N 5/332; H04N 5/23245; G06K 9/00771
  See application file for complete search history.

(56) References Cited

U.S. PATENT DOCUMENTS

| | | |
|---|---|---|
| D349,914 S | 8/1994 | Usui |
| D357,267 S | 4/1995 | Yotsuya |
| D372,490 S | 8/1996 | Sheffield et al. |
| 5,604,534 A | 2/1997 | Hedges |
| D385,571 S | 10/1997 | Abrams |
| 5,862,428 A | 1/1999 | An |
| 5,963,253 A | 10/1999 | Dwyer |
| 5,978,028 A | 11/1999 | Yamane |
| 5,995,273 A | 11/1999 | Chandrasekhar |
| 6,033,592 A | 3/2000 | Chandrasekhar |
| 6,088,470 A | 7/2000 | Camus |
| D429,269 S | 8/2000 | Renkis |
| D429,743 S | 8/2000 | Renkis |
| 6,141,052 A | 10/2000 | Fukumitsu |
| 6,147,701 A | 11/2000 | Tamura et al. |
| D442,202 S | 5/2001 | Pfeifer |
| D445,123 S | 7/2001 | Shen |
| 6,268,882 B1 | 7/2001 | Elberbaum |
| D446,534 S | 8/2001 | Zimmer |
| 6,271,752 B1 | 8/2001 | Vaios |
| D447,758 S | 9/2001 | Lin et al. |
| D449,630 S | 10/2001 | Rak et al. |
| D452,259 S | 12/2001 | Choi |
| 6,357,936 B1 | 3/2002 | Elberbaum |
| D455,164 S | 4/2002 | Tsang et al. |
| 6,462,781 B1 | 10/2002 | Arnold |
| D467,952 S | 12/2002 | Nakamura |
| D469,775 S | 2/2003 | Bradley |
| D470,874 S | 2/2003 | Chiu |
| D470,875 S | 2/2003 | Liao |
| 6,515,275 B1 | 2/2003 | Hunter et al. |
| 6,634,804 B1 | 10/2003 | Toste et al. |
| 6,650,694 B1 | 11/2003 | Brown et al. |
| 6,678,001 B1 | 1/2004 | Elberbaum |
| 6,714,236 B1 | 3/2004 | Wada |
| 6,714,286 B1 | 3/2004 | Wheel |
| 6,727,954 B1 | 4/2004 | Okada et al. |
| D489,388 S | 5/2004 | Saito et al. |
| 6,762,790 B1 | 7/2004 | Matko et al. |
| D511,352 S | 11/2005 | Oliver et al. |
| 7,034,884 B2 | 4/2006 | Misawa |
| 7,066,664 B1 | 6/2006 | Sitoh et al. |
| 7,076,162 B2 | 7/2006 | Yamashita |
| D527,755 S | 9/2006 | Wu |
| 7,151,565 B1 | 12/2006 | Wada |
| D534,938 S | 1/2007 | Beasley et al. |
| D537,097 S | 2/2007 | Freeman |
| D542,320 S | 5/2007 | Cheng |
| D552,649 S | 10/2007 | Logan et al. |
| D552,659 S | 10/2007 | Stephens et al. |
| D555,692 S | 11/2007 | Liu et al. |
| 7,290,740 B2 | 11/2007 | Joy et al. |
| D558,250 S | 12/2007 | Hsia |
| D563,446 S | 3/2008 | Stephens et al. |
| D575,316 S | 8/2008 | Liu et al. |
| 7,443,446 B2 | 10/2008 | Seo |
| 7,552,340 B2 | 6/2009 | Ooi et al. |
| 7,586,537 B2 | 9/2009 | Konishi et al. |
| D606,105 S | 12/2009 | Hinkel |
| 7,646,425 B2 | 1/2010 | Bohaker et al. |
| D610,601 S | 2/2010 | Melder |
| D614,223 S | 4/2010 | Kim et al. |
| 7,705,882 B2 | 4/2010 | Engel et al. |
| D627,815 S | 11/2010 | Oba |
| D628,223 S | 11/2010 | Kao |
| 7,930,369 B2 | 4/2011 | Marriott et al. |
| D638,461 S | 5/2011 | Kim et al. |
| 7,986,369 B1 | 7/2011 | Burns |
| D648,766 S | 11/2011 | Chen |
| D651,229 S | 12/2011 | Tan et al. |
| D651,230 S | 12/2011 | Tan et al. |
| 8,072,536 B1 | 12/2011 | Campbell |
| D651,633 S | 1/2012 | Park et al. |
| 8,139,122 B2 | 3/2012 | Rolston |
| D657,410 S | 4/2012 | Helaoui et al. |
| 8,165,146 B1 | 4/2012 | Melick et al. |
| 8,174,972 B2 | 5/2012 | Cernius et al. |
| 8,359,622 B1 | 1/2013 | Everson |
| D678,929 S | 3/2013 | Hancock |
| 8,402,145 B2 | 3/2013 | Holden et al. |
| 8,432,485 B1 | 4/2013 | Martinez et al. |
| D687,085 S | 7/2013 | Manson |
| 8,504,707 B2 | 8/2013 | Toebes et al. |
| 8,520,069 B2 | 8/2013 | Haler |
| D694,305 S | 11/2013 | Katori et al. |
| D697,119 S | 1/2014 | Park et al. |
| 8,625,024 B2 | 1/2014 | Hsu |
| D700,232 S | 2/2014 | Ramsay |
| 8,817,107 B2 | 8/2014 | Matsumoto et al. |
| D719,205 S | 12/2014 | Matsumoto |
| D729,296 S | 5/2015 | Shelton |
| D730,422 S | 5/2015 | Kim et al. |
| 9,071,740 B1 | 6/2015 | Duffy |
| D733,781 S | 7/2015 | Chen |
| D734,801 S | 7/2015 | Yang |
| 9,102,055 B1 | 8/2015 | Konolige et al. |
| D740,871 S | 10/2015 | Moon et al. |
| D742,954 S | 11/2015 | Simonelli et al. |
| D743,465 S | 11/2015 | Aglassinger et al. |
| D745,916 S | 12/2015 | Oh |
| D746,350 S | 12/2015 | Li |
| D748,709 S | 2/2016 | Jeong |
| D755,880 S | 5/2016 | Luo et al. |
| 9,330,307 B2 | 5/2016 | Litvak et al. |
| 9,386,230 B1 | 7/2016 | Duran et al. |
| 9,544,485 B2 | 1/2017 | Conner |
| 9,838,602 B2 | 12/2017 | Duran et al. |
| 9,866,760 B2 | 1/2018 | Dorai et al. |
| 9,875,718 B1 | 1/2018 | Basehore et al. |
| 2001/0015760 A1 | 8/2001 | Fellegara |
| 2001/0022550 A1 | 9/2001 | Steffel |
| 2002/0003575 A1 | 1/2002 | Marchese |
| 2002/0056794 A1 | 5/2002 | Ibrahim |
| 2002/0107591 A1 | 8/2002 | Gabai et al. |
| 2002/0141418 A1 | 10/2002 | Ben-Dor et al. |
| 2002/0159270 A1 | 10/2002 | Lynam et al. |
| 2002/0160724 A1 | 10/2002 | Arai et al. |
| 2002/0171754 A1 | 11/2002 | Lai et al. |
| 2002/0186317 A1 | 12/2002 | Kayanuma |
| 2002/0191082 A1 | 12/2002 | Fujino et al. |
| 2003/0164881 A1 | 9/2003 | Ohe et al. |
| 2003/0169354 A1 | 9/2003 | Aotsuka |
| 2003/0193409 A1 | 10/2003 | Crank |
| 2003/0216151 A1 | 11/2003 | Kitano et al. |
| 2004/0130655 A1 | 7/2004 | Yanakawa et al. |

(56) References Cited

U.S. PATENT DOCUMENTS

| | | |
|---|---|---|
| 2004/0132489 A1 | 7/2004 | Ryley et al. |
| 2004/0211868 A1 | 10/2004 | Holmes et al. |
| 2004/0246341 A1 | 12/2004 | Lee et al. |
| 2004/0247203 A1 | 12/2004 | Dell'Eva |
| 2004/0257431 A1 | 12/2004 | Girish et al. |
| 2005/0062720 A1 | 3/2005 | Rotzoll et al. |
| 2005/0068423 A1 | 3/2005 | Bear et al. |
| 2005/0073575 A1 | 4/2005 | Thacher et al. |
| 2005/0088537 A1 | 4/2005 | Nakamura et al. |
| 2005/0128336 A1 | 6/2005 | Toledano et al. |
| 2005/0146792 A1 | 7/2005 | Schofield et al. |
| 2005/0149213 A1 | 7/2005 | Guzak et al. |
| 2005/0151042 A1 | 7/2005 | Watson |
| 2005/0200751 A1 | 9/2005 | Weaver |
| 2005/0212958 A1 | 9/2005 | Su et al. |
| 2005/0227217 A1 | 10/2005 | Wilson |
| 2005/0230583 A1 | 10/2005 | Wu |
| 2005/0237425 A1 | 10/2005 | Lee et al. |
| 2005/0243022 A1 | 11/2005 | Negru |
| 2005/0243199 A1 | 11/2005 | Bohaker et al. |
| 2005/0275723 A1 | 12/2005 | Sablak et al. |
| 2006/0017842 A1 | 1/2006 | Jun |
| 2006/0024046 A1 | 2/2006 | Jones |
| 2006/0086871 A1 | 4/2006 | Joseph et al. |
| 2006/0109375 A1 | 5/2006 | Ho et al. |
| 2006/0109613 A1 | 5/2006 | Chen |
| 2006/0123129 A1 | 6/2006 | Toebes et al. |
| 2006/0123166 A1 | 6/2006 | Toebes et al. |
| 2006/0150227 A1 | 7/2006 | Julia et al. |
| 2006/0210259 A1 | 9/2006 | Matsumoto |
| 2006/0238707 A1 | 10/2006 | Elvesjo |
| 2006/0244583 A1 | 11/2006 | Kawada |
| 2006/0262194 A1 | 11/2006 | Swain |
| 2006/0282866 A1 | 12/2006 | Kuo |
| 2007/0001087 A1 | 1/2007 | Shyu et al. |
| 2007/0011375 A1 | 1/2007 | Kumar |
| 2007/0036539 A1 | 2/2007 | Martinez et al. |
| 2007/0050828 A1 | 3/2007 | Renzi et al. |
| 2007/0083791 A1 | 4/2007 | Panesar et al. |
| 2007/0219686 A1 | 9/2007 | Plante |
| 2007/0222888 A1 | 9/2007 | Xiao et al. |
| 2008/0001547 A1 | 1/2008 | Negru |
| 2008/0005432 A1 | 1/2008 | Kagawa |
| 2008/0012980 A1 | 1/2008 | Yamane |
| 2008/0026793 A1 | 1/2008 | Teegan et al. |
| 2008/0031161 A1 | 2/2008 | Osthus |
| 2008/0056709 A1 | 3/2008 | Huang et al. |
| 2008/0074535 A1 | 3/2008 | Ohsuga |
| 2008/0151052 A1 | 6/2008 | Erel et al. |
| 2008/0152218 A1 | 6/2008 | Okada et al. |
| 2008/0186150 A1 | 8/2008 | Kao |
| 2008/0189352 A1 | 8/2008 | Mitchell et al. |
| 2008/0231699 A1 | 9/2008 | Konishi et al. |
| 2008/0291260 A1 | 11/2008 | Dignan et al. |
| 2008/0309765 A1 | 12/2008 | Dayan et al. |
| 2008/0316594 A1* | 12/2008 | Hashiguchi ............ G02B 5/281 359/359 |
| 2009/0019187 A1 | 1/2009 | Okuma |
| 2009/0027570 A1 | 1/2009 | Fujinawa |
| 2009/0069633 A1 | 3/2009 | Orihara et al. |
| 2009/0102715 A1 | 4/2009 | Lou et al. |
| 2009/0141918 A1 | 6/2009 | Chris et al. |
| 2009/0141939 A1 | 6/2009 | Chambers et al. |
| 2009/0158373 A1 | 6/2009 | Belz et al. |
| 2009/0175612 A1 | 7/2009 | Wen |
| 2009/0195655 A1 | 8/2009 | Pandey |
| 2009/0245268 A1 | 10/2009 | Pugliese, IV |
| 2009/0248918 A1 | 10/2009 | Diab et al. |
| 2009/0289921 A1 | 11/2009 | Mickelson et al. |
| 2009/0296735 A1 | 12/2009 | Cernius et al. |
| 2009/0309969 A1 | 12/2009 | Wendler |
| 2010/0026811 A1 | 2/2010 | Palmer |
| 2010/0039253 A1 | 2/2010 | Zang |
| 2010/0076600 A1 | 3/2010 | Cross et al. |
| 2010/0085749 A1 | 4/2010 | Bezgachev |
| 2010/0109878 A1 | 5/2010 | Desrosiers |
| 2010/0180012 A1 | 7/2010 | Heo et al. |
| 2010/0199157 A1 | 8/2010 | Takaoka et al. |
| 2010/0271503 A1 | 10/2010 | Safaee-Rad et al. |
| 2010/0306399 A1 | 12/2010 | Khosravi et al. |
| 2010/0314508 A1 | 12/2010 | Bevirt et al. |
| 2010/0328475 A1 | 12/2010 | Thomas et al. |
| 2010/0330843 A1 | 12/2010 | Gao |
| 2011/0007159 A1 | 1/2011 | Camp et al. |
| 2011/0102438 A1 | 5/2011 | Mathe et al. |
| 2011/0102588 A1 | 5/2011 | Trundle et al. |
| 2011/0134243 A1 | 6/2011 | Siann et al. |
| 2011/0134313 A1 | 6/2011 | Kato |
| 2011/0158637 A1 | 6/2011 | Jung |
| 2011/0161076 A1 | 6/2011 | Davis et al. |
| 2011/0193964 A1 | 8/2011 | McLeod |
| 2011/0193967 A1 | 8/2011 | Matsumoto et al. |
| 2011/0205965 A1 | 8/2011 | Sprigg et al. |
| 2011/0231903 A1 | 9/2011 | Springer et al. |
| 2011/0234803 A1 | 9/2011 | Nakajima et al. |
| 2011/0255289 A1 | 10/2011 | Krah |
| 2011/0267492 A1 | 11/2011 | Prentice et al. |
| 2011/0285813 A1 | 11/2011 | Girdzijauskas et al. |
| 2011/0293137 A1 | 12/2011 | Gurman et al. |
| 2011/0299728 A1 | 12/2011 | Markovic et al. |
| 2012/0004956 A1 | 1/2012 | Huston et al. |
| 2012/0026325 A1 | 2/2012 | Bunker et al. |
| 2012/0081009 A1 | 4/2012 | Shteynberg |
| 2012/0086815 A1 | 4/2012 | Cooper et al. |
| 2012/0105632 A1 | 5/2012 | Renkis |
| 2012/0106037 A1 | 5/2012 | Diebel |
| 2012/0127270 A1 | 5/2012 | Zhang et al. |
| 2012/0140068 A1 | 6/2012 | Monroe et al. |
| 2012/0162416 A1 | 6/2012 | Su et al. |
| 2012/0194650 A1 | 8/2012 | Izadi et al. |
| 2012/0236373 A1 | 9/2012 | Oyama |
| 2012/0246359 A1 | 9/2012 | Scragg, Jr. et al. |
| 2012/0262575 A1 | 10/2012 | Champagne et al. |
| 2012/0263450 A1 | 10/2012 | Totani |
| 2012/0311686 A1 | 12/2012 | Medina et al. |
| 2012/0328259 A1 | 12/2012 | Seibert, Jr. et al. |
| 2012/0328358 A1 | 12/2012 | Akiyama |
| 2013/0007099 A1 | 1/2013 | Lee et al. |
| 2013/0053657 A1 | 2/2013 | Ziarno et al. |
| 2013/0156260 A1 | 6/2013 | Craig |
| 2013/0162629 A1 | 6/2013 | Huang et al. |
| 2013/0314544 A1 | 11/2013 | Ban |
| 2013/0321564 A1 | 12/2013 | Smith et al. |
| 2013/0342653 A1 | 12/2013 | McCloskey et al. |
| 2014/0032796 A1 | 1/2014 | Krause |
| 2014/0047143 A1 | 2/2014 | Bateman et al. |
| 2014/0049609 A1 | 2/2014 | Wilson et al. |
| 2014/0119604 A1 | 5/2014 | Mai et al. |
| 2014/0168421 A1 | 6/2014 | Xu et al. |
| 2014/0241387 A1 | 8/2014 | Ortiz |
| 2014/0267874 A1 | 9/2014 | Ratcliff et al. |
| 2014/0270387 A1 | 9/2014 | Hoof et al. |
| 2014/0333726 A1 | 11/2014 | Tokui et al. |
| 2014/0375635 A1 | 12/2014 | Johnson et al. |
| 2015/0049324 A1 | 2/2015 | Tan et al. |
| 2015/0052029 A1 | 2/2015 | Wu et al. |
| 2015/0120389 A1 | 4/2015 | Zhang et al. |
| 2015/0154467 A1 | 6/2015 | Feng et al. |
| 2015/0170371 A1 | 6/2015 | Muninder et al. |
| 2015/0181198 A1 | 6/2015 | Baele et al. |
| 2015/0228114 A1 | 8/2015 | Shapira et al. |
| 2016/0012588 A1 | 1/2016 | Taguchi et al. |
| 2016/0022181 A1 | 1/2016 | Valsan et al. |
| 2016/0029102 A1 | 1/2016 | Daily |
| 2016/0094763 A1 | 3/2016 | Patel |
| 2016/0094829 A1 | 3/2016 | Georgiev et al. |
| 2016/0142681 A1 | 5/2016 | Yu |
| 2016/0205318 A1 | 7/2016 | Wang et al. |
| 2016/0261829 A1 | 9/2016 | Olsson |
| 2017/0343801 A1 | 11/2017 | Dabic et al. |

(56) References Cited

U.S. PATENT DOCUMENTS

2018/0052376 A1* 2/2018 Burrows ............... G02F 1/19
2018/0113331 A1* 4/2018 Wang ............... G02B 27/0006

OTHER PUBLICATIONS

720p TF Card IP Wireless Camera Indoor Built-In Microphone Support Two Way Intercom for Smart Home Life and Unique PIR Alarm, Dec. 18, 2015, 3 pgs.
Adipranata, Fast method for multiple human face segmentation in color image, 2008 Second Int'l Conference on Furute Generation Communication and Networking, IEEE, 2008, 4 pgs.
Buy Svb Ladybird Tripod Webcam 4 Mega Pixel—4 Megapixel Web Cam Online, Best Prices in India: Redliff Shopping, Dec. 16, 2015, 3 pgs.
Drivers—Video Cam: Download Drivers for (Genius VideoCAM NB) Visual/Video Camera, Computer Question Help, Jul. 3, 2008, 2 pgs.
Ebay, Belkin F7D7601AU, Net Cam IP WIFI Baby Pet Monitor Camera Security Night Vision, Dec. 15, 2015, 5 pgs.
Ebay, Lot of 2 USB WebCam Web Cam Camera Logitech Quickcam HP Hewlett Packard, Dec. 16, 2015, 3 pgs.
Ebay, Motorola, MBP421 Digital Video & Sound Rechargeable Baby Monitor 1.8" LCD Screen, Dec. 15, 2015, 5 pgs.
Ebay, New Smallest Mini Camera Camcorder Video Recorder DVR Spy Hidden Pinhole Web Cam, Dec. 2, 2015, 4 pgs.
FabulaTech, What is USB for Remote Desktop, Dec. 12, 2011, 2 pgs, http://web.archive.org/web/20111212070644/http://www.usb-over-network.com/usb-for-remote-desktop.html.
FabulaTech, What is USB over Network, Dec. 17, 2011, 2 pgs, http://web.archive.org/web/20111217080253/http://www.usb-over-network.com/usb-over-network.html.
Goods in Stock PC Camera USB Plug and Play Free Driver Digital Webcam Stand Web Camera, Dec. 18, 2015, 12 pgs.
Hampapur, Smart surveillance: applications, technologies and implications, Information Communications and Signal Processing 2, 2003, pp. 1133-1138.
Heo, Fusion of visual and thermal face recognition techniques: A comparative study. Univ. of Tennessee, Knoxville, TN, 2003, 75 pgs.
Input Devices on Pintrest, Computers, Mice and Apples, Tanna Darty, Dec. 15, 2015, 1 pg.
Ion Camera, The Home Pro Wi-Fi Wireless Cloud Video Monitoring Security Camera (Black): Camera & Photo, Dec. 15, 2015, 6 pgs.
Joel Johnson, Glowdoodle Turns Your Crappy Webcam in a Crappier Webcam (in a good way), webcam—Boing Boing, Dec. 16, 2015, 8 pgs.
John Lewis, Samsung SEB-1019RW Add-On Night Vision Baby Monitor Camera, Dec. 15, 2015, 2 pgs.
KYO-TUX, IconArchive, Device WebCam Icon, Phuzion Iconset, Jun. 8 2010, 3 pgs.
Linksys Wireless-N Internet Home Monitoring Camera: Home Security Systems: Camera & Photo, Amazon.com, Dec. 15, 2015, 7 pgs.
Logi Circle: Portable Home Surveillance Camera from Logitech (video), AppleApple.Top World News, Feb. 10, 2015, 5 pgs.
Mini Universal Tripod Stand for Digital Camera and Webcam A33-in Tripods from Consumer Electronics on Aliexpress.com, Alibaba Group, Store: Angel One-Stop Shopping Center, Dec. 16, 2015, 3 pgs.
Parent, Android USB Port Forwarding, Dec. 26, 2011, 7 pgs, http://www.codeproject.com/Articles/191930/Android-Usb-Port-Forwarding.
Restore.Solutions, Numus Software, USB/VID, Syntek Web Cam Device Drivers, Dec. 12, 2015, 10 pgs.
Silberman, Indoor Segmentation and Support Ingerence from RGBD Images, Computer Vision—ECCV 2012, Springer Berlin Heidelbert, Oct. 2012, pp. 746-780.
SIV AI-BALL Very Small Hidden IP Network Camera Battery Powered Wireless IP Camera, Alibaba.com, 1999-2015, 7 pgs.
TechAllianz, How to Pick the Right Webcam, Satyakam, Jan. 22, 2013, 4 pgs.
TREK Ai-Ball Mini WiFi Spy Cam IP Wireless Camera for Iphone / Android /Ipad, Tmart, www.tmart.com, Dec. 18, 2015, 6 pgs.
Tripod Support for a QuickCam (or other webcam), Instructables, 2015, 3 pgs.
USB/IP Project, USB Request Over IP Network, Dec. 27, 2011, 5 pgs, http://web.archive.org/web/20111227171215/http://usbip.sourceforge.net/.
Web Camera 6 Stock Photo, Dreamstime, Dec. 16, 2015, 2 pgs.
Google, WO/ PCT/US2016/034462, International Preliminary Report on Patentability, dated Nov. 28, 2017, 8 pgs.
Google LLC, International Preliminary Report on Patentability/ Written Opinion, PCT/US2016/037069, dated Dec. 12, 2017, 7 pgs.

* cited by examiner

700

In accordance with a determination to transition the camera mode to a Day mode: 706

Generate by the controller a first voltage 708

Apply the first voltage to the electrochromic glass layer to cause the lens assembly to enter the first transmission state 710

Prior to the transition of the camera mode to the Day mode, the lens assembly was in the second transmission state 712

In response to the first voltage, remove by the electrochromic glass layer a substantial portion of the predefined band of IR wavelengths in ambient light incident on the camera and simultaneously passes by the electrochromic glass layer a substantial portion of visible wavelengths in the ambient light, thereby exposing the sensor array to the substantial portion of the visible wavelengths of the ambient light via the lens assembly 714

In accordance with a determination to transition the sensor mode to a Day mode: 806

Generate a first voltage 808

Apply the first voltage to the electrochromic glass layer to enable the first transmission state of the electrochromic glass layer 810

Prior to the transition of the sensor mode to the Day mode, the electrochromic glass layer was in the second transmission state 812

In response to the first voltage, remove by the electrochromic glass layer a substantial portion of the predefined band of IR wavelengths in ambient light incident on the image sensor device and simultaneously passes by the electrochromic glass layer a substantial portion of the visible wavelengths of the ambient light, thereby exposing the image sensor array to the substantial portion of the visible wavelengths of the ambient light 814

Determine that the camera mode of the camera is a first mode, wherein in the first mode, the index of refraction of the electrochromic glass lens has a first index value associated with a first focal length 904

In accordance with a determination that the camera mode at the first mode: 906

Generate by the controller a first voltage 908

Apply the first voltage on the electrochromic glass lens, thereby changing the index of refraction of the electrochromic glass lens to a second index value associated with a second focal length that is distinct from the first focal length 910

In accordance with a determination to transition the camera mode to an operation mode, determine a magnitude of a first voltage and generating by the controller the first voltage 1004

> In the operation mode, the camera is configured to capture media content in a field of view illuminated with light having the first predefined band of wavelengths 1006

Apply the first voltage to cause the lens assembly to enter the first filtering mode 1008

In response to the first voltage, transmit by the electrochromic glass layer a substantial portion of the first predefined band of wavelengths in the ambient light, thereby exposing the sensor array to the substantial portion of the first predefined band of wavelengths of the ambient light via the lens assembly 1010

Figure 10

ELECTROCHROMIC FILTERING IN A CAMERA

RELATED APPLICATIONS

This application is a continuation of U.S. patent application Ser. No. 15/339,839, filed Oct. 31, 2016, entitled "Electrochromic Filtering in a Camera," which is hereby incorporated by reference in its entirety.

This application is related to the following applications, each of which is hereby incorporated by reference in its entirety: U.S. patent application Ser. No. 14/723,276, filed on May 27, 2015, entitled, "Multi-mode LED Illumination System," and U.S. patent application Ser. No. 14/738,225, filed on Jun. 12, 2015, entitled, "Day and Night Detection Based on One or More of Illuminant Detection, Lux Level Detection, and Tilting."

TECHNICAL FIELD

The disclosed implementations relate generally to controlling a camera with Day and Night modes, including, but not limited to, integrating electrochromic filtering into optical apparatus of the camera and automatically removing/passing infrared light component in ambient light incident on the camera.

BACKGROUND

Some security cameras operate in one of two modes (i.e., Day mode and Night mode) depending on the ambient lighting conditions. Day mode is used when there is sufficient ambient light to adequately illuminate the scene. Night mode (also called infrared mode) is used when there is not enough ambient light to adequately illuminate the scene, in which case the camera relies on additional infrared illumination (e.g., using onboard infrared light emitting diodes). A security camera configured to operate in both Day mode and Night mode often includes an infrared (IR) filter that is disposed at two distinct locations associated with Day and Night modes, respectively. Specifically, in Day mode, the IR filter is disposed with a first position in which it is interposed between a lens assembly and a sensor array of the camera, while in Night mode, the IR filter is disposed with a second position in which it is not interposed between the lens assembly and the sensor array. As part of initiating a change of the camera mode to Night mode, the IR filter has to be mechanically moved from the first position to the second position, and as part of initiating a change of the camera mode to Day mode, the IR filter has to be mechanically moved from the second position to the first position.

One challenge for such security cameras is mechanical failure of the IR filter due to constant switching of the security cameras between Day mode and Night mode. These security cameras often have to operate constantly over days, months and even years (e.g., switch between the day and Night modes at least twice every day), and a mechanical motor that drives the IR filter could fail in the long term due to such constant operation. Thus, it would be beneficial to use a more reliable filtering mechanism in a security camera than the current mechanically driven IR filter.

SUMMARY

Accordingly, there is a need for a security camera that implements more effective methods for controlling IR filtering when the camera switches between a Night mode to a Day mode.

In accordance with one aspect of the application, a method for controlling a camera system is performed at a camera including a controller, a sensor array including a plurality of sensor elements, and a lens assembly that is configured to focus light on the sensor array. The lens assembly includes an electrochromic glass layer disposed in front of the sensor array and having optical transmission properties that are responsive to voltage applied to the electrochromic glass layer. The lens assembly further includes a first transmission state in which the electrochromic glass layer is substantially opaque to a predefined band of IR wavelengths, and a second transmission state in which the electrochromic glass layer is substantially transparent to the predefined band of IR wavelengths and visible wavelengths.

The method for controlling the camera mode includes, in accordance with a determination to transition the camera mode to a Day mode, generating by the controller a first voltage, and applying the first voltage to the electrochromic glass layer to cause the lens assembly to enter the first transmission state. Prior to the transition of the camera mode to the Day mode, the lens assembly was in the second transmission state. The method for controlling the camera mode further includes in response to the first voltage, removing by the electrochromic glass layer a substantial portion of the predefined band of IR wavelengths in ambient light incident on the camera, and simultaneously passing by the electrochromic glass layer a substantial portion of visible wavelengths in the ambient light, thereby exposing the sensor array to the substantial portion of the visible wavelengths of the ambient light via the lens assembly.

In accordance with another aspect of the application, some implementations include a camera for controlling a camera system. The camera further includes: a controller, a sensor array comprising a plurality of sensor elements, and a lens assembly that is configured to focus light on the sensor array. The lens assembly includes an electrochromic glass layer disposed in front of the sensor array and having optical transmission properties that are responsive to voltage applied to the electrochromic glass layer. The camera is configured to perform any of the methods described herein (e.g., any of the methods described above).

In accordance with one aspect of the application, a method for controlling a sensor is performed at an image sensor device including an electrochromic glass layer and an image sensor array. The image sensor array further includes a plurality of sensor elements. The electrochromic glass layer is disposed in front of the sensor array and has optical transmission properties that are responsive to voltage applied to the glass. The electrochromic glass layer includes a first transmission state in which the electrochromic glass layer is substantially opaque to a predefined band of IR wavelengths, and a second transmission state in which the electrochromic glass layer is substantially transparent to the predefined band of IR wavelengths and visible wavelengths. The method for controlling the sensor mode includes in accordance with a determination to transition the sensor mode to a Day mode, generating a first voltage, and applying the first voltage to cause the electrochemical glass layer to enter the first transmission state. Prior to the transition of the sensor mode to the Day mode, the lens assembly was in the second transmission state. The method for controlling the sensor mode further includes in response to the first voltage, removing by the electrochromic glass layer a substantial portion of the predefined band of IR wavelengths in ambient light incident on the image sensor device and simultaneously passing by the electrochromic glass layer a substantial portion of visible wavelengths in the ambient light, thereby exposing the image sensor array to the substantial portion of the visible wavelengths of the ambient light.

In accordance with another aspect of the application, some implementations include an image sensor array for controlling a sensor mode. The image sensor array includes an electrochromic glass layer and an image sensor array having a plurality of sensor elements. The electrochromic glass layer is disposed in front of the sensor array and has optical transmission properties that are responsive to voltage applied to the glass. The electrochromic glass layer include a first transmission state in which transmission of a predefined band of IR wavelengths is substantially reduced and a second transmission state in which the electrochromic glass layer is substantially transparent to the predefined band of IR wavelengths and visible wavelengths. The image sensor array is configured to perform the method described above.

Thus, a camera and an image sensor device are provided to implement more effective methods for controlling IR filtering when the camera and the image sensor device switch between Night mode to Day mode. Such methods may complement or replace conventional methods for controlling IR filtering associated with various operation modes.

Further, in accordance with another aspect of the application, a method is implemented at a camera for controlling a lens assembly. The camera includes a controller, an image sensor array including a plurality of sensor elements, and the lens assembly configured to focus light on the sensor array, and the lens assembly further includes an electrochromic glass lens disposed in front of the sensor array and having an index of refraction that is variable and responsive to voltage applied on the electrochromic glass lens. The method for controlling the lens assembly includes determining that the camera mode of the camera is a first mode, and in the first mode, the index of refraction of the electrochromic glass lens has a first index value associated with a first focal length. The method for controlling the lens assembly further includes in accordance with a determination that the camera mode at the first mode, generating by the controller a first voltage and applying the first voltage on the electrochromic glass lens, thereby changing the index of refraction of the electrochromic glass lens to a second index value associated with a second focal length that is distinct from the first focal length.

In accordance with another aspect of the application, a method is implemented at a camera for controlling a filtering effect. The camera includes a controller, a sensor array comprising a plurality of sensor elements, and a lens assembly configured to focus light on the sensor array. The lens assembly includes an electrochromic glass layer disposed in front of the sensor array and having optical transmission properties that are responsive to voltage applied to the electrochromic glass layer. The lens assembly includes a first filtering mode in which the electrochromic glass layer is configured to band-transmit a first predefined band of wavelengths. The method for controlling the filtering effect of the camera includes, in accordance with a determination to transition the camera mode to an operation mode, determining a magnitude of a first voltage and generating by the controller the first voltage. In the operation mode, the camera is configured to capture media content in a field of view illuminated with light having the first predefined band of wavelengths. The method for controlling the filtering effect of the camera further includes applying the first voltage to cause the lens assembly to enter the first filtering mode, and in response to the first voltage, passing by the electrochromic glass layer a substantial portion of the first predefined band of wavelengths in the ambient light, thereby exposing the sensor array to the substantial portion of the first predefined band of wavelengths of the ambient light via the lens assembly.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 7 is a flow diagram of a method of controlling electrochromic filtering of a camera according to a camera mode in accordance with some implementations.

FIG. 8 is a flow diagram of a method of controlling electrochromic filtering of an image sensor device according to a sensor mode in accordance with some implementations.

FIG. 9 is a flow diagram of a method of controlling electrochromic filtering of a lens assembly in accordance with some implementations.

FIG. 10 is a flow diagram of a method of controlling a filtering effect of a camera in accordance with some implementations.

Like reference numerals refer to corresponding parts throughout the several views of the drawings.

DESCRIPTION OF IMPLEMENTATIONS

Figure 1:
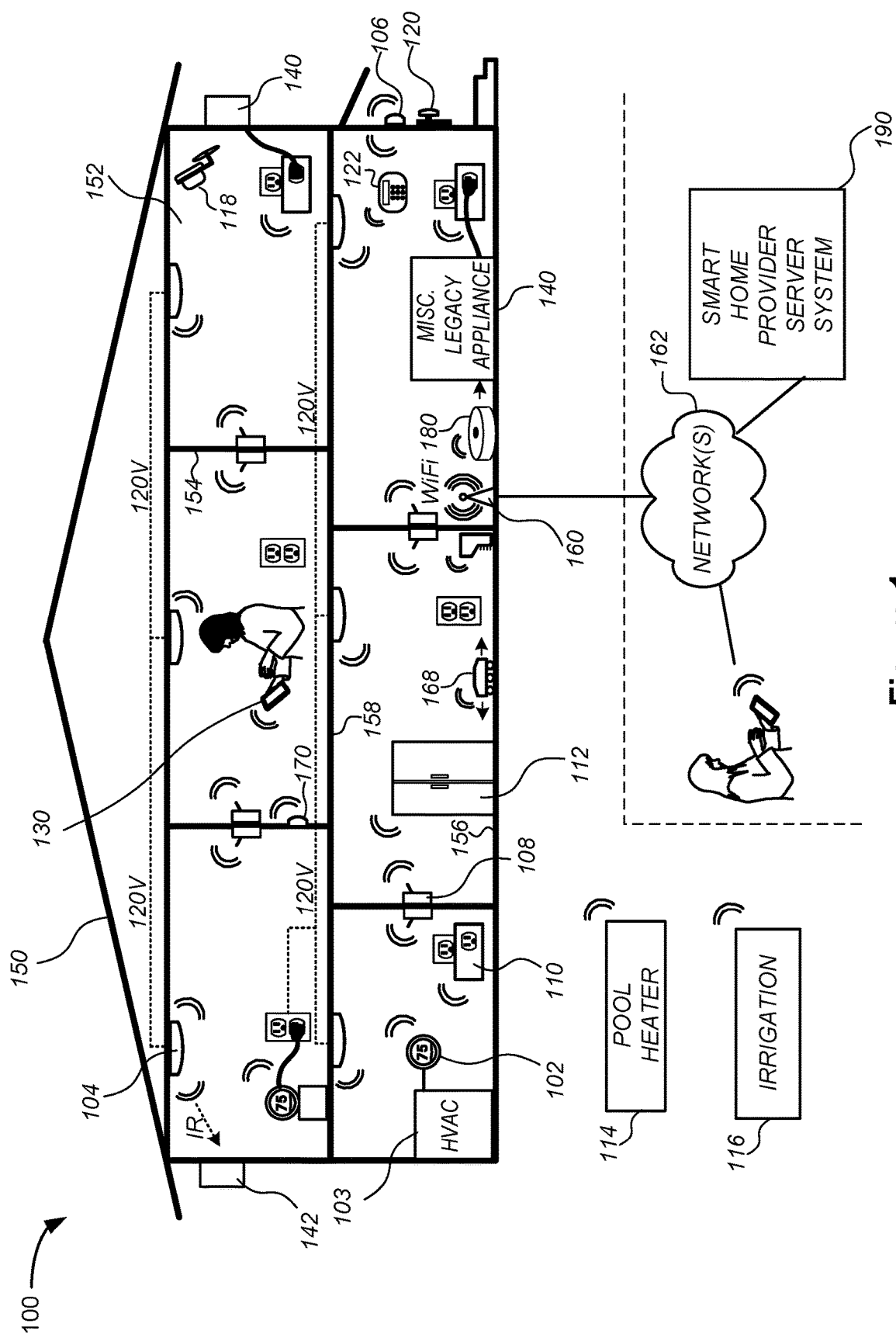
FIG. 1 is an example smart home environment in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

One or more network-connected cameras could be set up in a smart home environment to provide video monitoring and security therein. In some implementations, the cameras operate in two modes, a Day mode in which there is enough ambient light to capture color video of a scene, and a Night mode in which the camera captures video of a scene using onboard LED illumination when there is not enough ambient light. A program module of the camera may decide when to switch between Night mode and Day mode using one or more of: illuminant detection, lux detection, and tiling. When the camera is in Day mode, IR filtering is enabled to block a substantial portion of the IR components of the incident light. When the camera is in Night mode, IR filtering is disabled so an image sensor array of the cameras can receive incident IR light from a scene illuminated by the camera's onboard IR illuminators or external IR illuminators.

To overcome mechanical failure issues associated with conventional mechanically driven IR filters, an electrochromic glass layer is applied in a camera to control filtering of the IR components of the incident light. Specifically, in accordance with a determination to transition a camera mode to a Day mode, the camera generates a first voltage which is applied to the electrochromic glass layer to enable electrochromic filtering. In response to the first voltage, the electrochromic glass layer removes a substantial portion of a predefined band of IR wavelengths in ambient light incident on the camera, and simultaneously passes a substantial portion of visible wavelengths of the ambient light, thereby exposing the sensor array to the substantial portion of the visible wavelengths of the ambient light via a lens assembly of the camera. Alternatively, in accordance with a determination to transition the camera mode to a Night mode, the camera generates by the controller a second voltage that is distinct from the first voltage (in some implementations, the camera disables the first voltage, i.e., setting the second voltage to 0V), and applies the second voltage on the electrochromic glass layer of the electrochromic glass layer to disable electrochromic filtering. In response to the second voltage, the electrochromic glass layer passes by the a substantial portion of the predefined band of IR wavelengths and a substantial portion of visible wavelengths in the ambient light incident on the camera, thereby exposing the sensor array exposed to the ambient light via the lens assembly without interference by electrochromic filtering of the electrochromic glass layer.

Further, in some implementations, use of the electrochromic glass layer may introduce additional benefits, e.g., enabling a high dynamic range (HDR) mode. When two distinct voltages are applied sequentially on the electrochromic glass layer, distinct filtering effects associated with visible wavelengths of the incident light are enabled, and result in two images captured under two different exposure conditions. Image information of these two images can be combined to provide a high quality image that has an enhanced dynamic range.

FIG. 1 is an example smart home environment 100 in accordance with some implementations. The Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, one or more devices in the smart home environment 100 need not be physically within the structure 150. For example, a device controlling a pool heater 114 or irrigation system 116 may be located outside of the structure 150. The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network and/or with a central server or a cloud-computing system (e.g., a smart home provider server system 190) to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), one or more intelligent, multi-sensing, network-connected alarm systems 122 (hereinafter referred to as "smart alarm systems 122"), one or more intelligent, multi-sensing, network-connected wall switches 108 (hereinafter referred to as "smart wall switches 108"), and one or more intelligent, multi-sensing, network-connected wall plug interfaces 110 (hereinafter referred to as "smart wall plugs 110"). In some implementations, the smart home environment 100 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108. The smart home environment 100 may also include communication with devices outside of the physical home but within a proximate geographical range of the home. For example, the smart home environment 100 may include a pool heater monitor 114 and/or an irrigation monitor 116.

In some implementations, the smart home environment 100 includes one or more network-connected cameras 118 that are configured to provide video monitoring and security in the smart home environment 100. In some implementations, cameras 118 also capture video when other conditions or hazards are detected, in order to provide visual monitoring of the smart home environment 100 when those conditions or hazards occur. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). For example, cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104. The smart home environment 100 may include one or more sound and/or vibration sensors for detecting abnormal sounds and/or vibrations. These sensors may be integrated with any of the devices described above. The sound sensors detect sound above a decibel threshold. The vibration sensors detect vibration above a threshold directed at a particular area (e.g., vibration on a particular window when a force is applied to break the window).

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 130 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 130. In some examples, some or all of the occupants (e.g., individuals who live in the home) may register their device 130 with the smart home environment 100. Such registration may be made at a central server (e.g., a smart home provider server system 190) to authenticate the occupant and/or the device as being associated with the home and to give permission to the occupant to use the device to control the smart devices in the home. An occupant may use their registered device 130 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 130, the smart home environment 100 may make inferences about which individuals live in the home and are therefore occupants and which devices 130 are associated with those individuals. As such, the smart home environment may "learn" who is an occupant and permit the devices 130 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 402.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 190 (also called a central server system and/or a cloud-computing system herein). The smart home provider server system 190 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 190 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

Figure 2:
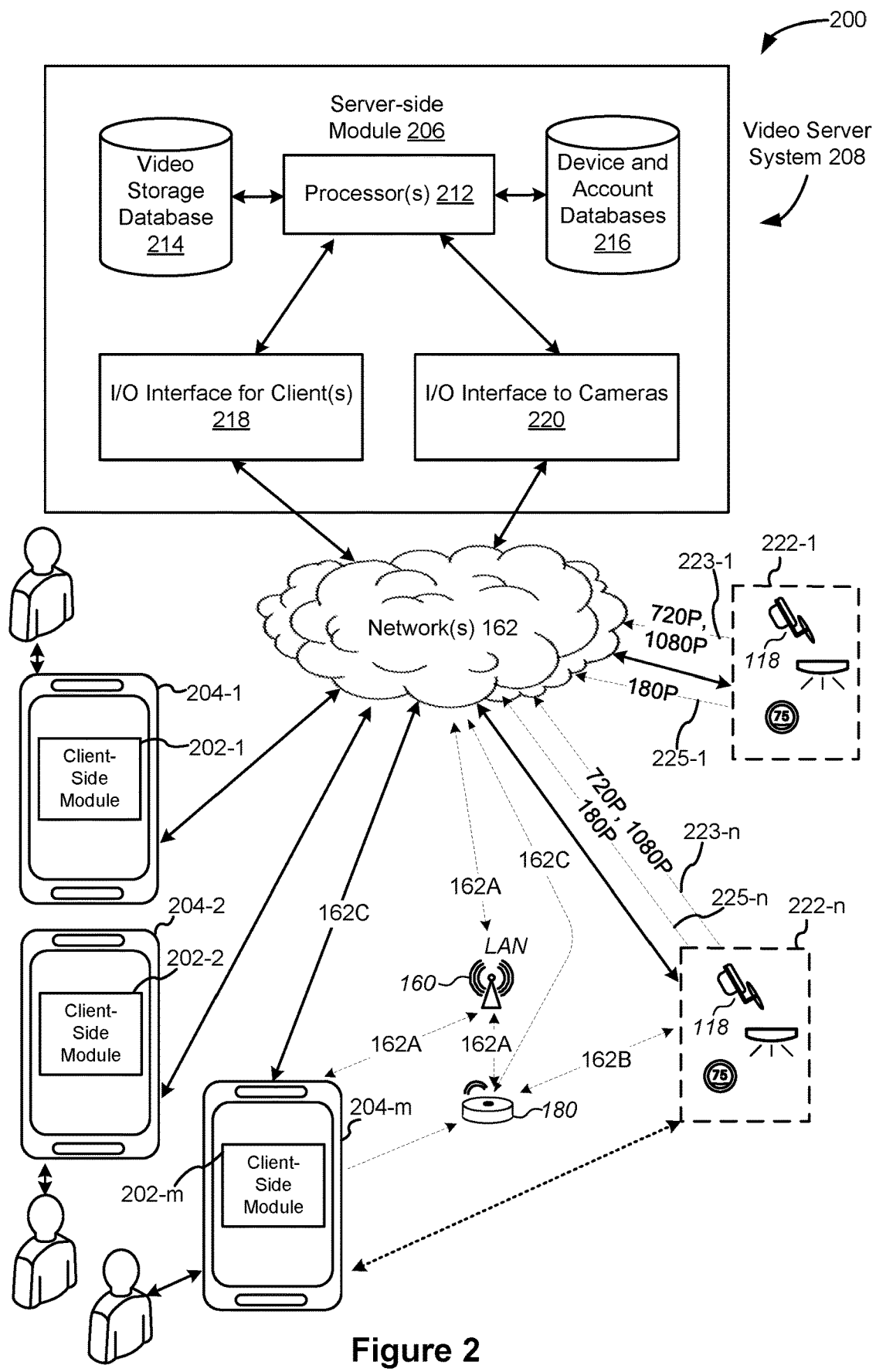
FIG. 2 illustrates a representative operating environment in which a video server system provides data processing for monitoring and facilitating review of video streams captured by video cameras in accordance with some implementations.

FIG. 2 illustrates a representative operating environment 200 in which a video server system 208 provides data processing for monitoring and facilitating review of video streams (including motion events and alert events) captured by video cameras 118. As shown in FIG. 2, the video server system 208 receives video data from video sources 222 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the video server system 208 provides video monitoring data for the video sources 222 to client devices 204 associated with the reviewer accounts. For example, the portable electronic device 130 is an example of the client device 204.

In some implementations, the smart home provider server system 190 or a component thereof serves as the video server system 208; the video server system 208 is a part or component of the smart home provider server system 190. In some implementations, the video server system 208 is a dedicated video processing server that provides video processing services to video sources and client devices 204 independent of other services provided by the video server system 208.

In some implementations, each of the video sources 222 includes one or more video cameras 118 that capture video and send the captured video to the video server system 208 substantially in real-time. In some implementations, each of the video sources 222 optionally includes a controller device (not shown) that serves as an intermediary between the one or more cameras 118 and the video server system 208. The controller device receives the video data from the one or more cameras 118, optionally performs some preliminary processing on the video data, and sends the video data to the video server system 208 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 208.

In some implementations, a camera 118 of a video source 222 captures video at a first resolution (e.g., 720P and/or 1080P) and/or a first frame rate (24 frames per second), and sends the captured video to the video server system 208 at both the first resolution (e.g., the original capture resolution(s), the high-quality resolution(s) such as 1080P and/or 720P) and the first frame rate, and at a second, different resolution (e.g., 180P) and/or a second frame rate (e.g., 5 frames per second or 10 frames per second). For example, the camera 118 captures a video 223-1 at 720P and/or 1080P resolution (the camera 118 may capture a video at 1080P and create a downscaled 720P version, or capture at both 720P and 1080P). The video source 222 creates a second (or third), rescaled (and optionally at a different frame rate than the version 223-1) version 225-1 of the captured video at 180P resolution, and transmits both the original captured version 223-1 (i.e., 1080P and/or 720P) and the rescaled version 225-1 (i.e., the 180P version) to the video server system 208 for storage. In some implementations, the rescaled version has a lower resolution, and optionally a lower frame rate, than the original captured video. The video server system 208 transmits the original captured version or the rescaled version to a client 204, depending on the context. For example, the video server system 208 transmits the rescaled version when transmitting multiple videos to the same client device 204 for concurrent monitoring by the user, and transmits the original captured version in other contexts. In some implementations, the video server system 208 downscales the original captured version to a lower resolution, and transmits the downscaled version.

In some implementations, a camera 118 of a video source 222 captures video at a first resolution (e.g., 720P and/or 1080P) and/or a first frame rate, and sends the captured video to the video server system 208 at the first resolution (e.g., the original capture resolution(s); the high-quality resolution(s) such as 1080P and/or 720P) and first frame rate for storage. When the video server system 208 transmits the video to a client device 204, the video server system 208 may downscale the video to a second, lower resolution (e.g., 180P) and/or second, lower frame rate for the transmission, depending on the context. For example, the video server system 208 transmits the downscaled version when transmitting multiple videos to the same client device 204 for concurrent monitoring by the user, and transmits the original captured version in other contexts.

In some implementations, the camera 118 operates in two modes, a Day mode in which there is enough ambient light to capture color video of a scene, and a Night mode in which the camera captures video of a scene using onboard LED illumination when there is not enough ambient light (e.g., as described in the cross-referenced U.S. patent application Ser. No. 14/723,276, filed on May 27, 2015, entitled, "Multi-mode LED Illumination System."). As described herein, in some implementations, the camera 118 includes a program module that decides when to switch from Night mode to Day mode using one or more of: illuminant detection (detecting the type of ambient light based on R/G and B/G component ratios of the ambient light), lux detection (detecting the ambient light level), and tiling (performing illuminant detection and/or lux detection for sub-regions of an image sensor array so as to detect localized/point light source that only impact a portion of the image sensor array).

Referring to FIG. 2, in accordance with some implementations, each of the client devices 204 includes a client-side module 202. The client-side module 202 communicates with a server-side module 206 executed on the video server system 208 through the one or more networks 162. The client-side module 202 provides client-side functionalities for the event monitoring and review processing and communications with the server-side module 206. The server-side module 206 provides server-side functionalities for event monitoring and review processing for any number of client-side modules 202 each residing on a respective client device 204. The server-side module 206 also provides server-side functionalities for video processing and camera control for any number of the video sources 222, including any number of control devices and the cameras 118.

In some implementations, the server-side module 206 includes one or more processors 212, a video storage database 214, device and account databases 216, an I/O interface to one or more client devices 218, and an I/O interface to one or more video sources 220. The I/O interface to one or more clients 218 facilitates the client-facing input and output processing for the server-side module 206. In some implementations, the I/O interface to clients 218 or a transcoding proxy computer (not shown) rescales (e.g., downscales) and/or changes the frame rate of video for transmission to a client 204. The databases 216 store a plurality of profiles for reviewer accounts registered with the video processing server, where a respective user profile includes account credentials for a respective reviewer account, and one or more video sources linked to the respective reviewer account. The I/O interface to one or more video sources 220 facilitates communications with one or more video sources 222 (e.g., groups of one or more cameras 118 and associated controller devices). The video storage database 214 stores raw video data received from the video sources 222, as well as various types of metadata, such as motion events, event categories, event category models, event filters, and event masks, for use in data processing for event monitoring and review for each reviewer account.

In some implementations, the server-side module 206 receives information regarding alert events detected by other smart devices 204 (e.g., hazards, sound, vibration, motion). In accordance with the alert event information, the server-side module 206 instructs one or more video sources 222 in the smart home environment 100 where the alert event is detected to capture video and/or associate with the alert event video, received from the video sources 222 in the same smart home environment 100, that is contemporaneous or proximate in time with the alert event.

Examples of a representative client device 204 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 204-1, 204-2, and 204-m are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 208 is implemented on one or more standalone data processing apparatuses or a distributed network of computers. In some implementations, the video server system 208 also employs various virtual devices and/or services of third party service providers (e.g., third-party cloud service providers) to provide the underlying computing resources and/or infrastructure resources of the video server system 208. In some implementations, the video server system 208 includes, but is not limited to, a handheld computer, a tablet computer, a laptop computer, a desktop computer, or a combination of any two or more of these data processing devices or other data processing devices.

The server-client environment 200 shown in FIG. 2 includes both a client-side portion (e.g., the client-side module 202) and a server-side portion (e.g., the server-side module 206). The division of functionalities between the client and server portions of operating environment 200 can vary in different implementations. Similarly, the division of functionalities between the video source 222 and the video server system 208 can vary in different implementations. For example, in some implementations, client-side module 202 is a thin-client that provides only user-facing input and output processing functions, and delegates all other data processing functionalities to a backend server (e.g., the video server system 208). Similarly, in some implementations, a respective one of the video sources 222 is a simple video capturing device that continuously captures and streams video data to the video server system 208 with no or limited local preliminary processing on the video data. Although many aspects of the present technology are described from the perspective of the video server system 208, the corresponding actions performed by the client device 204 and/or the video sources 222 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the video server system 208, the client device 204, and the video sources 222 cooperatively.

The electronic devices, the client devices or the server system communicate with each other using the one or more communication networks 162. In an example smart home environment, two or more devices (e.g., the network interface device 160, the hub device 180, and the client devices 204-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 222-n exchange data with the hub device 180. Alternatively, in some situations, some of the electronic devices of the video sources 222-n communicate with the network interface device 160 directly via the same sub-network 162A that couples devices 160, 180 and 204-m. In some implementations (e.g., in the network 162C), both the client device 204-m and the electronic devices of the video sources 222-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 222-n. As explained above, the network interface device 160 and the hub device 180 optionally communicate with each other via a sub-network 162A. In some implementations, the hub device 180 is omitted, and the functionality of the hub device 180 is performed by the video server system 208, video server system 252, or smart home provider server system 190.

In some implementations, the video server system 208 is, or includes, a dedicated video processing server configured to provide data processing for monitoring and facilitating review of alert events (e.g., motion events) in video streams captured by video cameras 118. In this situation, the video server system 208 receives video data from video sources 222 (including cameras 118) located at various physical locations (e.g., inside homes, restaurants, stores, streets, parking lots, and/or the smart home environments 100 of FIG. 1). Each video source 222 may be bound to one or more user (e.g., reviewer) accounts, and the video server system 252 provides video monitoring data for the video source 222 to client devices 204 associated with the reviewer accounts. For example, the portable electronic device 166 is an example of the client device 204.

Figure 3:
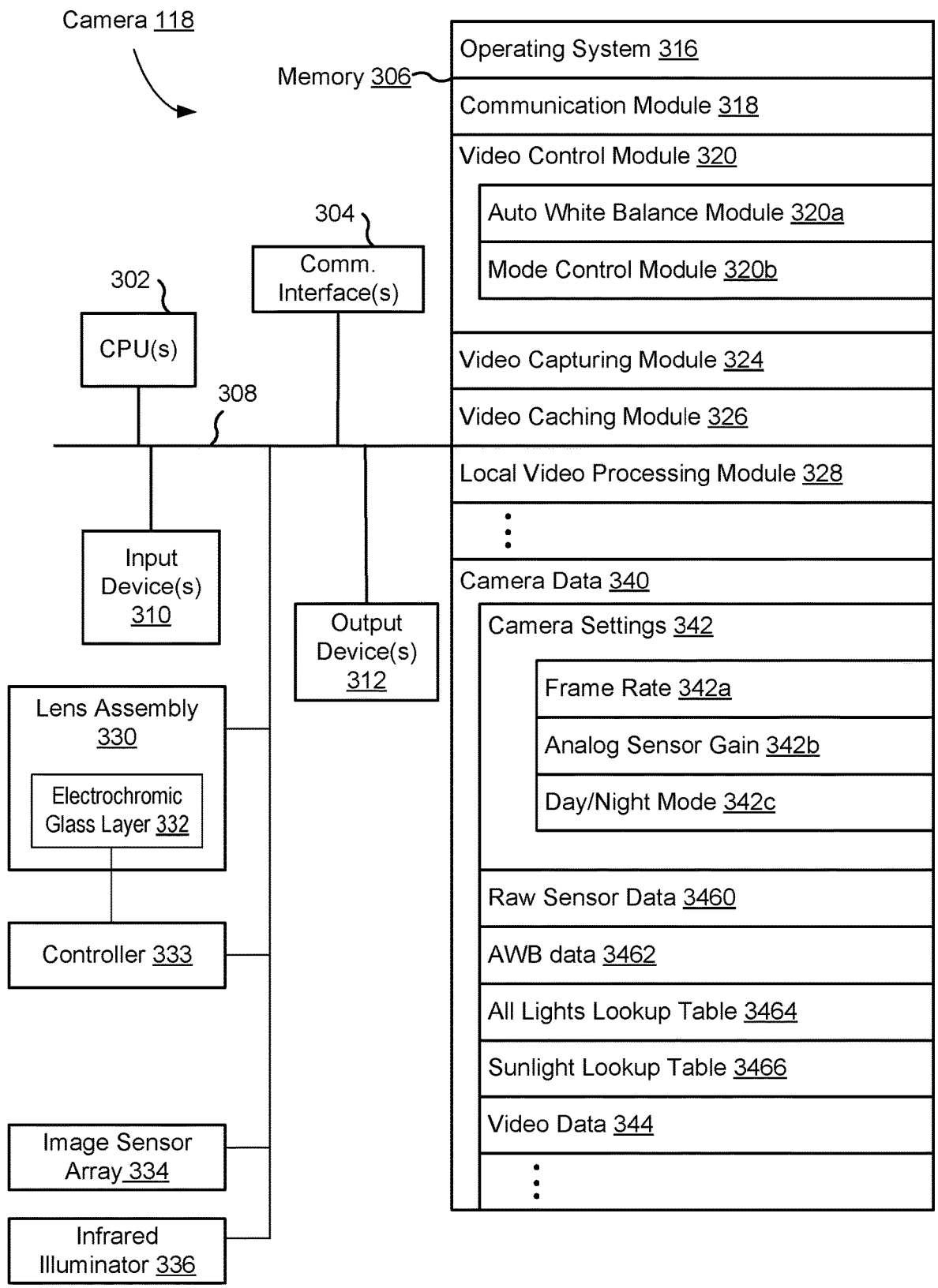
FIG. 3 is a block diagram illustrating a representative camera in accordance with some implementations.

FIG. 3 is a block diagram illustrating a representative camera 118 in accordance with some implementations. In some implementations, the camera 118 includes one or more processing units or controllers (e.g., CPUs, ASICs, FPGAs, microprocessors, and the like) 302, one or more communication interfaces 304, memory 306, one or more communication buses 308 for interconnecting these components (sometimes called a chipset), a lens assembly 330 including an electrochromic glass layer 332, a controller 333, an image sensor array 334, and infrared illuminators 336 (e.g., IR LEDs). In some implementations, the lens assembly 330 focuses incident light on the image sensor array 334, which captures respective color components (e.g., R, G and B components) of the incident light focused on respective sensor array locations. When the camera is in Day mode, the controller 333 generates a first voltage and applies the first voltage on the electrochromic glass layer 332. Electrochromic filtering of the electrochromic glass layer 332 is thereby enabled for blocking a substantial portion of the IR components of the incident light. Alternatively, when the camera is in Night mode, the controller 333 removes the first voltage or generates a second voltage applied on the electrochromic glass layer 332. Electrochromic filtering of the electrochromic glass layer 332 is therefore disabled, allowing the image sensor array 334 to receive incident IR light from a scene illuminated by the camera's onboard IR illuminators 336 or external IR illuminators. In some implementations, the camera 118 includes one or more input devices 310 such as one or more buttons for receiving input and one or more microphones. In some implementations, the camera 118 includes one or more output devices 312 such as one or more indicator lights, a sound card, a speaker, a small display for displaying textual information and error codes, playing audio, etc.

Communication interfaces 304 include, for example, hardware capable of data communications using any of a variety of custom or standard wireless protocols (e.g., IEEE 402.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 316 including procedures for handling various basic system services and for performing hardware dependent tasks;
- Network communication module 318 for connecting the camera 118 to other computing devices (e.g., hub device server system 208, video server system 252, the client device 130, network routing devices, one or more controller devices, and networked storage devices) connected to the one or more networks 162 via the one or more communication interfaces 304 (wired or wireless);
- Video control module 320 for modifying the operation mode (e.g., zoom level, resolution, frame rate, recording and playback volume, lighting adjustment (e.g., performed by auto white balance (AWB) program module 320a), AE and IR modes, etc.) of the camera 118, enabling/disabling the audio and/or video recording functions of the camera 118, changing the pan and tilt angles of the camera 118, resetting the camera 118, enabling/disabling electrochromic filtering of the electrochromic glass layer 332, and/or the like; The video control module 320 also includes a mode control program module 320b that determines when to switch from Night mode to Day mode and vice-versa in accordance with some implementations; The mode control module 320b also generates a voltage generation control signal to control the controller 333 to enable or disable electrochromic filtering in the electrochromic glass layer 332 in accordance with a determination to transition to Day mode or Night mode, respectively;
- Video capturing module 324 for capturing and generating a video stream and sending the video stream to the video server system 208 as a continuous feed or in short bursts, and optionally generating a rescaled version of the video stream and sending the video stream at the original captured resolution and the rescaled resolution;
- Video caching module 326 for storing some or all captured video data locally at one or more local storage devices (e.g., memory, flash drives, internal hard disks, portable disks, etc.);
- Local video processing module 328 for performing preliminary processing of the captured video data locally at the camera 118, including for example, compressing and encrypting the captured video data for network transmission, preliminary motion event detection, preliminary false positive suppression for motion event detection, preliminary motion vector generation, etc.; and
- Camera data 340 storing data, including but not limited to:
    - Camera settings 342, including network settings, camera operation settings (such as frame rate 342a, analog sensor gain 342b, and Day/Night mode setting 342c), camera storage settings, etc.; and
    - Video data 344, including video segments and motion vectors for detected motion event candidates to be sent to the hub device server system 208 or video server system 252.
    - Raw sensor data 3460 (e.g., R, G and B components) captured from sensor pixel locations in the sensor array 334 and saved as a raw image frame; in some implementations, the sensor is a "Bayer" sensor, where R, G and B pixels are captured from alternate sensor pixel locations in such a way that two times more G component values are captured than R or B component values; some implementations employ different types of sensors to provide the Raw sensor data 3460, including sensors with other arrangements of R, G and B color filters (e.g., a sensor producing an equal number of R, G and B components), and sensors that employ different color filters (e.g., a sensor with cyan (C), yellow (Y) and magenta (M) color filters, which produces C, Y and M components). Implementations described herein may employ data (e.g., color component values or ratios thereof) from all or a portion of the sensor array 334; accordingly, a reference herein to a "sensor array" or a "color sensor array" may refer to all or a portion of the sensor array 334. In some implementations, a group of sensor arrays, including a sensor array subdivided into tiles, may be referred to as a "sensor array system" or a "color sensor array system."

Auto white balance (AWB) data 3462, including data derived from the raw sensor data 3460 used to identify and compensate for the color temperature of the ambient light condition (e.g., sunlight vs. incandescent light vs. fluorescent light, etc.); in some implementations, the AWB data 3462 includes R/G and B/G ratios for respective pixel locations derived from the corresponding raw Bayer sensor data 3460; in some implementations, these ratios are used directly to determine whether to switch from Night mode to Day mode.

All_lights lookup table (LUT) 3464, a table used in the Night mode to Day mode switching method of the present application to identify based on pairs of R/G and B/G ratios from the AWB table 3462 whether the associated ambient light is due to other than an IR illuminant; the majority of the table is filled with 1s (meaning the light is due to other than an IR-only illuminant), except for a small region around R/G=1, B/G=1 associated with 0 lux (IR only) light sources.

Sunlight lookup table (LUT) 3466, a table used in the Night mode to Day mode switching method of the present application to identify based on pairs of R/G and B/G ratios from the AWB table 3462 whether the associated ambient light is due to sunlight, incandescent or similar light sources that are comparatively heavy emitters of IR light as compared to visible light; this table corresponds to a small region of the All_lights table—and is filled with 1s to represent where the corresponding R/G and B/G values are associated with sunlight and incandescent light.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some implementations, the camera 118 captures surveillance video using a digital imaging system. Digital images (frames) are captured as a sequence at a particular frame rate 342a, compressed, and then sent to the "cloud" (e.g., the video server system 208) for storage and retrieval. In some implementations, each frame (e.g., the raw sensor data 3460) is composed of 1280 by 320 pixels (1280×720) and each pixel location has 3 color components, red, green and blue. The camera 118 operates in one of two modes (e.g., indicated by the Day/Night mode value 342c) depending on the ambient lighting conditions. Day mode is used when there is sufficient ambient light to adequately illuminate the scene. Night mode is used when there is not enough light to adequately illuminate the scene.

In some implementations, when operating in Day mode, the camera 118 uses the ambient lighting sources to illuminate the scene and capture surveillance video. In some implementations, the minimum lux level at which the camera captures 118 video in Day mode is between 0.1 to 1 lux depending on the color temperature of the dominant illuminant. Once the minimum lux level is reached, the camera automatically switches to Night mode. Switching to Night mode includes disabling electrochromic filtering of the electrochromic glass layer 332 and enabling a set of IR LEDs 336 to provide illumination for the scene. Night mode is maintained until the camera 118 detects an external illuminant.

As explained above, one challenge for using a mechanically driven IR filter is a risk of mechanical failure of the IR filter caused by constant switching of the camera between Day mode and Night mode. There has been a need for a camera that applies a more reliable filtering mechanism than the mechanically driven IR filter when the camera constantly switches between a Night mode to a Day mode.

Figure 4:
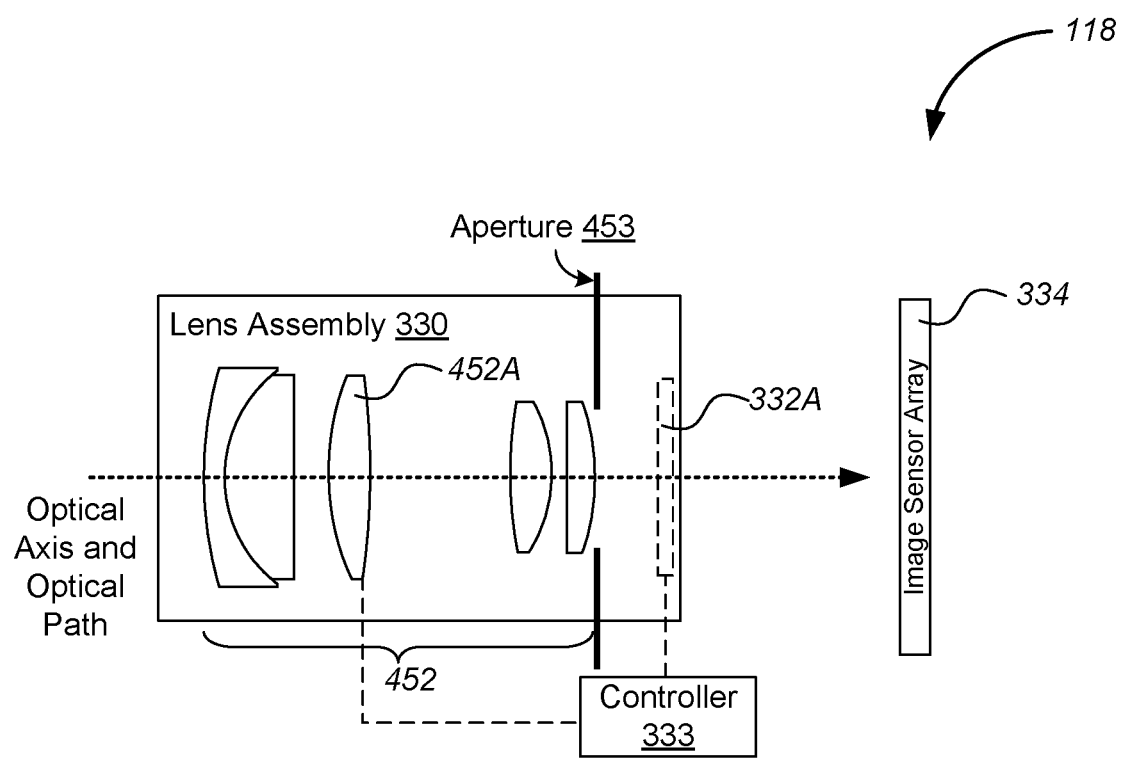
FIG. 4 is a cross-sectional view of a front portion of a camera based on electrochromic filtering in accordance with some implementations.

FIG. 4 is a cross-sectional view of a front portion of a camera 118 based on electrochromic filtering in accordance with some implementations. The camera 118 includes a controller 333, memory storing instructions for execution by the controller (e.g., mode control module 320b), a sensor array 334 including a plurality of sensor elements, an aperture 453 and a lens assembly 330 that is configured to focus light on the sensor array. Lens(es) and filter(s) of the lens assembly 330 are disposed on an optical path, and aligned with respect to an optical axis. Incident light travels along the optical path to pass the lens assembly 330 and the aperture 453 and reach the image sensor array 334.

In some implementations, the lens assembly 330 includes an electrochromic glass layer 332 disposed on the optical path of the incident light and at a location in front of the sensor array 334. The electrochromic glass layer 332 has optical transmission properties that are responsive to voltage applied to the electrochromic glass layer 332. As such, the lens assembly 330 include a first transmission state in which the electrochromic glass layer 332A is substantially opaque to a predefined band of IR wavelengths, and a second transmission state in which the electrochromic glass layer is substantially transparent to the predefined band of IR wavelengths and visible wavelengths.

The camera 118 operates in two modes, a Day mode in which there is enough ambient light to capture color video of a scene, and a Night mode in which the camera captures video of a scene using onboard LED illumination when there is not enough ambient light. When the camera is in Day mode, IR filtering is enabled to block a substantial portion of the IR components of the incident light. More specifically, when the camera 118 determines to transition the camera mode to a Day mode, the controller 333 generates a first voltage. The first voltage is applied to the electrochromic glass layer 332 to cause the lens assembly 330 to enter the first transmission state. Prior to this transition of the camera mode to the Day mode, the camera operates in a Night mode, and the lens assembly 330 was in the second transmission state. Then, in response to the first voltage, the electrochromic glass layer 332 removes a substantial portion of the predefined band of IR wavelengths in ambient light incident on the camera, and simultaneously passes by the electrochromic glass layer 332 a substantial portion of visible wavelengths in the ambient light, thereby exposing the sensor array 334 to the substantial portion of the visible wavelengths of the ambient light via the lens assembly 330.

In some implementations, the magnitude of the first voltage is not greater than 5V, and induces a limited amount of current consumption. In some implementations, the first voltage is sustained on the electrochromic glass layer at the first transmission state. In some implementations, when the camera transitions to the camera mode to the Day mode, the first voltage is applied on the electrochromic glass layer for a predetermined duration of time and is removed after the predetermined duration of time.

Alternatively, when the camera is in Night mode, IR filtering is disabled so a sensor array 334 of the cameras can receive incident IR light from a scene illuminated by the camera's onboard IR illuminators or external IR illuminators. More specifically, in some implementations, when the camera 118 determines to transition the camera mode to the Night mode, the controller 333 generates a second voltage that is distinct from the first voltage. The second voltage is applied on the electrochromic glass layer 332 to cause the lens assembly 330 to enter the second transmission state. In response to the second voltage, the electrochromic glass layer 332 passes a substantial portion of the predefined band of IR wavelengths and a substantial portion of visible wavelengths in ambient light incident on the camera, thereby exposing the sensor array exposed to the ambient light via the lens assembly without interference by electrochromic filtering of the electrochromic glass layer. In some implementations, the second voltage is substantially equal to zero, i.e., the first voltage is removed or disabled from the electrochromic glass layer 332.

In some implementations, the onboard IR illuminators 336 include one or more infrared light emitting diodes (e.g., as described in the cross-referenced U.S. patent application Ser. No. 14/723,276, filed on May 27, 2015, entitled, "Multi-mode LED Illumination System."). In accordance with the determination to transition the camera mode to the Night mode, the infrared light emitting diodes are powered on to illuminate a field of view while electrochromic filtering of the electrochromic glass layer 332 is disabled.

In some implementations, the lens assembly 330 includes one or more optical lenses 452 in addition to the electrochromic glass layer 332, and the one or more optical lenses 452 are configured to focus incident light of the camera 118 onto the sensor array 334. Optionally, the electrochromic glass layer 332 is a standalone optical filter disposed between the one or more optical lenses 452 and the sensor array 334 (as shown in FIG. 4B), between two of the one or more optical lenses 452 or in front of the one or more optical lenses 452. Optionally, the one or more optical lenses 452 include a first optical lens 452A configured to focus light on the sensor array 334. The first optical lens 452A is integrated with a layer of electrochromic glass coating to form the electrochromic glass layer 332. The electrochromic glass layer 332 therefore includes the first optical lens 452A, which is also configured to filter the substantial portion of the predefined band of IR wavelengths in the ambient light when the camera 118 determines to transition its camera mode to the Day mode.

As described herein, in some implementations, the camera 118 includes a mode control module 320b that decides when to switch from Night mode to Day mode using one or more of: illuminant detection (detecting the type of ambient light based on R/G and B/G component ratios of the ambient light), lux detection (detecting the ambient light level), and tiling (performing illuminant detection and/or lux detection for sub-regions of an image sensor array so as to detect localized/point light source that only impact a portion of the image sensor array). Specifically, when the camera mode is a Night mode, the mode control module 320b determines whether the ambient light is due to other than an IR light source, detects an ambient light level, and initiates a change of the camera mode to the Day mode when it is determined that the ambient light that is not filtered by the electrochromic glass layer 332 is due to other than an IR light source and that the ambient light level exceeds a first lux threshold. In contract, the mode control module 320b maintains the camera 118 in the Night mode if it is determined that the ambient light is due to other than an IR light source and that the ambient light threshold does not exceed the first lux threshold.

Further, in some implementations, wherein the sensor elements of the sensor array 334 include first, second and third pixels each of which has respective peak responses at different respective visible light frequencies (e.g., for green, red and blue colors, respectively). The mode control module 320b detects a first light component, a second light component and a third light component of the ambient light by averaging output signals from the first, second and third pixels, respectively. Respective values of the first, second and third light components are further used to determine whether the ambient light is due to other than an IR light source. Additionally, in some implementations, the mode control module 320b is also configured to determine whether the ambient light is due to sunlight or an incandescent light source based on values of the first, second and third light components. After it is determined that the ambient light is due to sunlight or an incandescent light source, the camera 118 initiates a change of the camera mode to the Day mode only when the ambient light level exceeds a second lux threshold higher than the first lux threshold. More details on detection and switching of Day mode and Night mode are described in the cross-referenced U.S. patent application Ser. No. 14/738,225, filed on Jun. 12, 2015, entitled, "Day and Night Detection Based on One or More of Illuminant Detection, Lux Level Detection, and Tilting."

Referring to FIG. 4B, the electrochromic glass layer 332 is disposed in front of the sensor array 334 either as a standalone filter or a layer of electrochromic glass coated on an optical lens 452A. Moreover, in some implementations, the electrochromic glass layer 332 can be integrated on the image sensor array 334 of the camera 118.

Figure 5:
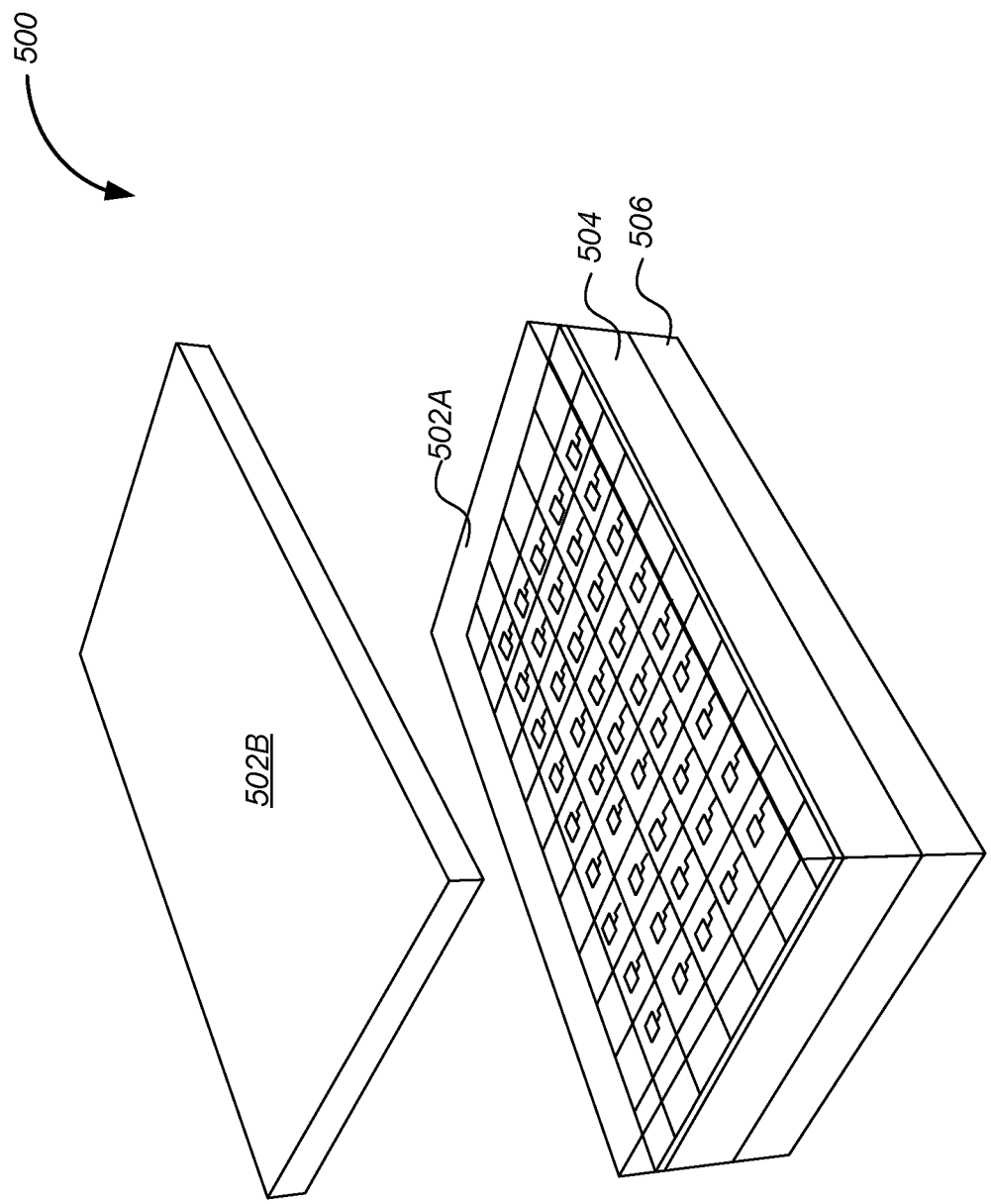
FIG. 5 is a perspective view of an image sensor device integrated with an electrochromic glass layer in accordance with some implementations.

FIG. 5 is an image sensor device 500 integrated with an electrochromic glass layer in accordance with some implementations. The image sensor device 500 includes an electrochromic glass layer 502 and an image sensor array 504 formed at or mounted on a substrate 506 (e.g., a glass or silicon die, a printed circuit board). The image sensor array 504 further includes a plurality of sensor elements and is configured to capture images or video clips. The electrochromic glass layer 502 is disposed in front of the sensor array and has optical transmission properties that are responsive to voltage applied to the glass. The electrochromic glass layer 502 includes a first transmission state in which the electrochromic glass layer 502 is substantially opaque to a predefined band of IR wavelengths, and a second transmission state in which the electrochromic glass layer 502 is substantially transparent to the predefined band of IR wavelengths and visible wavelengths. The image sensor device 500 operates in two modes, a Day mode in which there is enough ambient light to capture color video of a scene, and a Night mode in which the image sensor device 500 captures image of a scene using IR illumination when there is not enough ambient light.

In accordance with a determination to transition the sensor mode to a Day mode, the image sensor device 500 generates a first voltage, and applies the first voltage to cause the electrochromic glass layer 502 to enter the first transmission state. Prior to the transition of the sensor mode to the Day mode, the electrochromic glass layer 502 was in the second transmission state. In response to the first voltage, the image sensor device 500 removes by the electrochromic glass layer 502 a substantial portion of the predefined band of IR wavelengths in ambient light incident on the image sensor device, and simultaneously passes by the electrochromic glass layer a substantial portion of visible wavelengths in the ambient light, thereby exposing the image sensor array 504 to the substantial portion of the visible wavelengths of the ambient light.

In some implementations, the electrochromic glass layer 502A is monolithically coated on the sensor elements of the image sensor array directly. In some implementations, the electrochromic glass layer (not shown in FIG. 5) is integrated on a transparent packaging cover that is assembled onto a top surface of the image sensor device 504. In some implementations, the electrochromic glass layer 502B (also shown as the electrochromic glass layer 332 in FIG. 4B) is disposed as a separate and standalone optical filter in the optical path of ambient light incident on the image sensor device 500. In some implementations, the electrochromic glass layer is integrated on an optical lens 452 configured to focus light on the image sensor array 500 (as shown in FIG. 4B).

The image sensor device 500 can be part of a camera (e.g., the camera 118). The image sensor device 500 can also be used as a motion sensor that detects motion of an object in a field of view associated with the image sensor device 500.

In some implementations, transitions of the sensor mode to Day mode or Night mode can be similarly decided by one or more programs associated with the image sensor array 500. In some implementations, the image sensor array 500 can also be configured to implement an HDR mode. More details on determination of the camera mode and the HDR mode are described above with reference to FIGS. 3 and 4B. For brevity, they are not repeated herein.

Figure 6C:
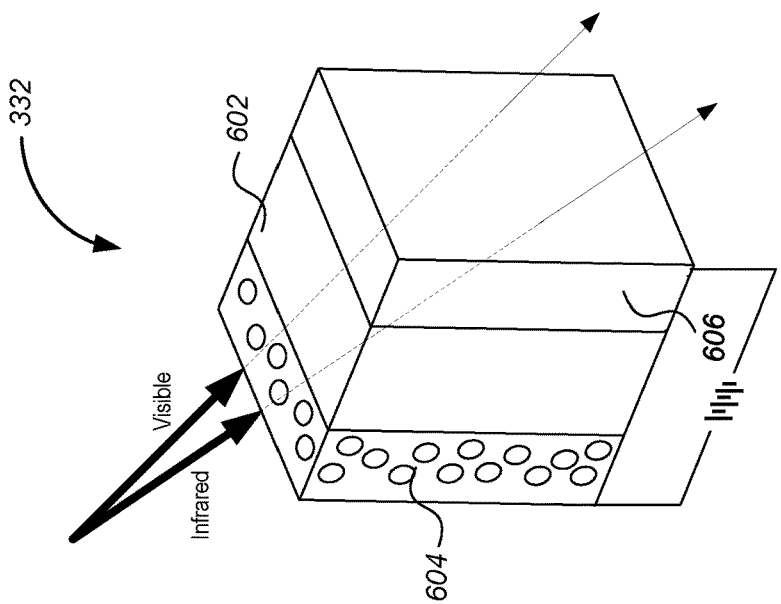
FIG. 6C is an electrochromic glass layer that is biased under a second voltage and removes a substantial portion of both a predefined band of IR wavelengths and visible wavelengths of ambient light incident on a camera in accordance with some implementations.
Figure 6B:
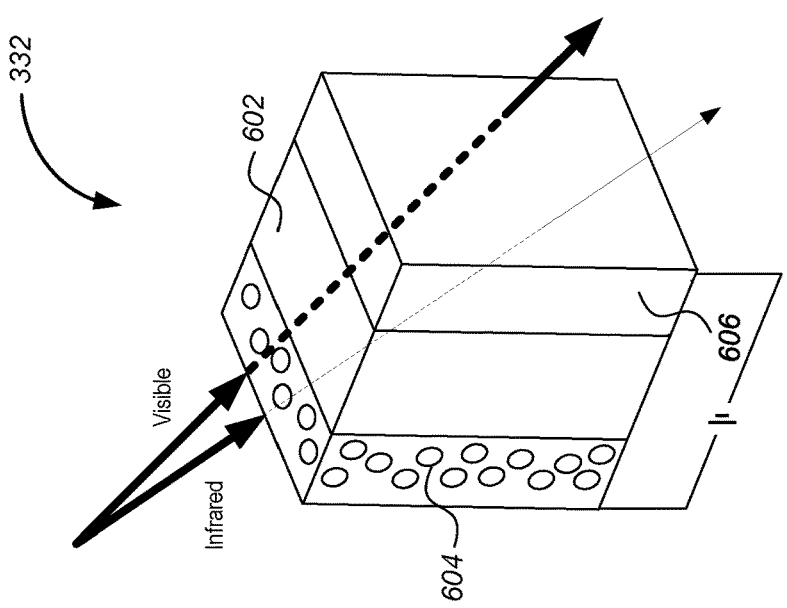
FIG. 6B is an electrochromic glass layer that is biased under a first voltage and removes a substantial portion of a predefined band of IR wavelengths of ambient light incident on a camera in accordance with some implementations.
Figure 6A:
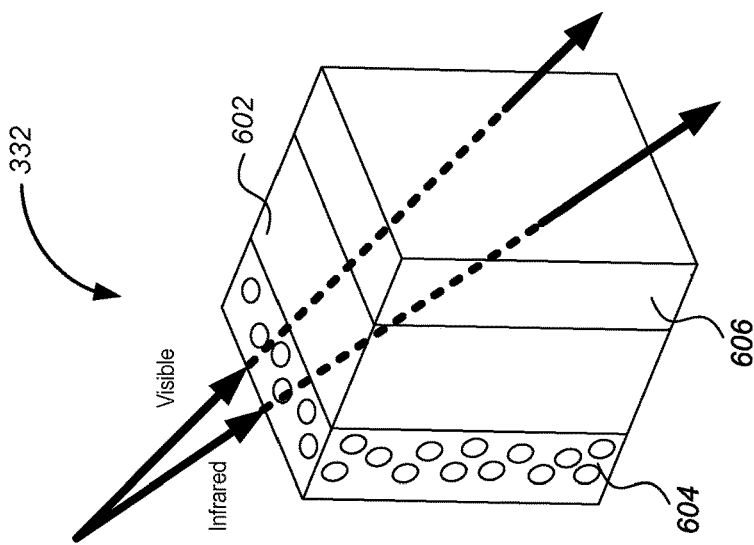
FIG. 6A is an electrochromic glass layer that is not biased and transmits both visible and infrared wavelengths of ambient light incident on a camera in accordance with some implementations.

FIG. 6A is an electrochromic glass layer 332 that is not biased and passes both visible and infrared wavelengths of ambient light incident on a camera in accordance with some implementations. FIG. 6B is an electrochromic glass layer 332 that is biased under a first voltage and removes a substantial portion of a predefined band of IR wavelengths of ambient light incident on a camera in accordance with some implementations. FIG. 6C is an electrochromic glass layer 332 that is biased under a second voltage and removes a substantial portion of both a predefined band of IR wavelengths and visible wavelengths of ambient light incident on a camera in accordance with some implementations. In some implementations, the second voltage is substantially larger than the first voltage.

The electrochromic glass layer 332 includes an electrolyte layer 602, a first electrode 604 and a counter electrode 606 that are configured to act as an electrochemical cell. The first and second voltages are applied on the first electrode 604 at the Day mode and at the Night mode, respectively, while the counter electrode 606 is optionally grounded. Nanoparticle-in-glass composite material is deposited on a first side of the electrolyte layer 602 and forms the first electrode 604. For example, the first electrode 602 may include a layer of indium tin oxide (ITO) nanocrystals in glass made out of niobium oxide. The ITO nanocrystals are combined with niobium-containing ions (also called polyoxometalate (POM) clusters) in solution, and the first electrode is formed when the solution covers a surface of the electrochromic glass layer 332. In some implementations, the ITO nanocrystal solution is optionally evaporated or spray coated onto the first side of the electrolyte layer 602 to form the first electrode 604.

In some implementations, when no electrical voltage is applied between the first electrode 604 and the counter electrode 606, the electrochromic glass layer 332 operates at a second transmission state in which it is transparent to a predefined band of IR wavelengths (e.g., near-infrared wavelengths) and visible wavelengths of incident light. This second transmission state could be activated in accordance with a determination to transition a camera mode to a Night mode, when IR illumination is necessary for capturing images.

Referring to FIG. 6B, in some implementations, when a first voltage having a substantially intermediate magnitude (e.g., 0-5V) is applied, charge carrier (e.g., lithium ions and electrons) migrates in this electrochemical cell, which chemically reduces nanoparticles in the first electrode 604 and therefore blocks a substantially portion of the predefined band of IR wavelengths (e.g., near-infrared wavelengths) in ambient light incident on the electrochromic glass layer 332. Under these circumstances, the electrochromic glass layer 332 operates at a first transmission state in which transmission of the predefined band of IR wavelengths is substantially reduced. This first transmission state could be activated in accordance with a determination to transition a camera mode to a Day mode, when there is enough visible light to capture color images of a scene.

Referring to FIG. 6C, the camera mode includes a third mode. In accordance with a determination that the camera mode is the third mode, a third voltage is generated and applied on the electrochromic glass layer 332. In response to the third voltage, the electrochromic glass layer 332 removes a substantial portion of the predefined band of the ambient wavelengths while reducing the intensity of the visible wavelengths in the ambient light to a first visible light intensity, thereby exposing the sensor array to the visible wavelengths of the ambient light having the first visible light intensity. The first visible light intensity is distinct from the visible light intensity to which the electrochromic glass layer is exposed when the first voltage is applied thereon. In some implementations, the third voltage is substantially larger than the first voltage.

In some implementations, two images could be captured for a scene when the first and third voltages are applied on the electrochromic glass layer 332 to enable two different exposure conditions for the camera 118. Specifically, the third mode includes a high dynamic range (HDR) mode. The camera 118 captures a first image of a scene when the first voltage is applied on the electrochromic glass layer 332, and captures a second image of a substantially identical scene when the third voltage is applied on the electrochromic glass layer. For a recorded video clip, the camera 118 captures the first and second images for each frame of the recorded video clip. The camera 118 or a remote server then combines at least the first and second images to obtain a HDR image (or a HDR frame of the recorded video clip). The HDR image would have a higher dynamic range and thereby enables a better image quality than either one of the first and second images, because the HDR image combines dynamic ranges associated with the exposure conditions of the first and second images.

In some implementations, when the third mode includes the HDR mode, the first voltage does not have to be one of at least two voltages used to create the different exposure conditions for the camera 118. The controller 333 of the camera 118 generates a fourth voltage in addition to the third voltage as described above. The fourth voltage is distinct from the third voltage. The fourth voltage is applied on the electrochromic glass layer 332. In response to the fourth voltage, the electrochromic glass layer 332 removes a substantial portion of the predefined band of the wavelengths while reducing the intensity of the visible wavelengths in the ambient light to a second visible light intensity. The second visible light intensity is distinct from the first visible light intensity to which the electrochromic glass layer is exposed when the third voltage is applied thereon, thereby enabling two distinct exposure conditions for the same scene.

In this HDR mode, the camera 118 captures a first image of a scene when the third voltage is applied on the electrochromic glass layer 332, and a second image of the substantially identical scene when the fourth voltage is applied on the electrochromic glass layer 332. For a recorded video clip, the camera 118 captures the first and second images for each frame of the recorded video clip. The camera 118 or a remote server then combines at least the first and second images to obtain a HDR image (or a HDR frame of the recorded video clip). In some implementations, the camera 118 or the remote server combines more than two images of the scene to obtain the HDR image.

In some implementations, the first voltage is sustained on the electrochromic glass layer 332 at the first transmission state. In some implementations, when the camera transitions the camera mode to the Day mode, the first voltage is applied on the electrochromic glass layer 332 for a predetermined duration of time, and removed after the predetermined duration of time. Similarly, each of the other voltages (e.g., the second, third or fourth voltage) is optionally sustained on the electrochromic glass layer 332 or applied on the electrochromic glass layer 332 for a respective duration of time, in accordance with a determination to transition the camera mode to a respective camera mode (e.g., the Night mode and the HDR mode).

FIG. 7 is a flow diagram of a method 700 of controlling electrochromic filtering of a camera (e.g., the camera 118) according to a camera mode in accordance with some implementations. Referring to FIG. 3, the camera includes a controller 333, a sensor array 334 including a plurality of sensor elements, and a lens assembly 330 that is configured to focus light on the sensor array 334. Optionally, the camera includes memory 306 storing instructions for execution by the controller 333. The lens assembly 330 further includes an electrochromic glass layer 332 disposed in front of the sensor array 334 and having optical transmission properties that are responsive to voltage applied to the electrochromic glass layer 332. The lens assembly includes a first transmission state in which the electrochromic glass layer is substantially opaque to a predefined band of IR wavelengths and a second transmission state in which the electrochromic glass layer is substantially transparent to the predefined band of IR wavelengths and visible wavelengths.

In accordance with a determination (706) to transition the camera mode to a Day mode, the controller 333 generates (708) a first voltage, and the first voltage is applied (710) to the electrochromic glass layer 332 to cause the lens assembly 330 to enter the first transmission state. Prior to the transition of the camera mode to the Day mode, the lens assembly 330 was (712) in the second transmission state. In response to the first voltage, electrochromic glass layer 332 removes (714) a substantial portion of the predefined band of IR wavelengths in ambient light incident on the camera, and simultaneously passes by the electrochromic glass layer a substantial portion of visible wavelengths in the ambient light, thereby exposing the sensor array to the substantial portion of the visible wavelengths of the ambient light via the lens assembly. In some implementations, the mode control module 320b includes one or more programs having instruction for controlling the controller 333 to generate the first voltage in accordance with a determination to transition the camera mode to the Day mode.

More details on a Night mode, a HDR mode and characteristics of the electrochromic layer 332 are discussed above with reference to FIGS. 1-6.

FIG. 8 is a flow diagram of a method 800 of controlling electrochromic filtering of an image sensor device (e.g., the sensor array 334 or 500) according to a sensor mode in accordance with some implementations. Specifically, the image sensor device 500 includes an electrochromic glass layer 502 and an image sensor array 504, and the image sensor array further includes a plurality of sensor elements. The electrochromic glass layer 502 is disposed in front of the sensor array and has optical transmission properties that are responsive to voltage applied to the glass. The electrochromic glass layer further includes a first transmission state in which the electrochromic glass layer is substantially opaque to a predefined band of IR wavelengths and a second transmission state in which the electrochromic glass layer is substantially transparent to the predefined band of IR wavelengths and visible wavelengths.

In accordance with a determination to transition (806) the sensor mode to a Day mode, the image sensor device 500 generates (808) a first voltage, and applies (810) the first voltage to cause the electrochromic glass layer to enter the first transmission state. Prior to the transition of the sensor mode to the Day mode, the electrochromic glass layer was (812) in the second transmission state. In response to the first voltage, the electrochromic glass layer 502 removes (814) a substantial portion of the predefined band of IR wavelengths in ambient light incident on the image sensor device, and simultaneously passes by the electrochromic glass layer a substantial portion of visible wavelengths in the ambient light, thereby exposing the image sensor array to the substantial portion of the visible wavelengths of the ambient light. Likewise, more details on a Night mode, a HDR mode and characteristics of the electrochromic layer 332 are discussed above with reference to FIGS. 1-6.

FIG. 9 is a flow diagram of a method 900 of controlling electrochromic filtering of a lens assembly (e.g., the lens assembly 330) in accordance with some implementations. The lens assembly 330 is part of a camera 118 further including a controller 333 and an image sensor array 334 having a plurality of sensor elements. The lens assembly 330 is configured to focus light on the sensor array 334, and further includes an electrochromic glass lens disposed in front of the sensor array and having an index of refraction that is variable and responsive to voltage applied on the electrochromic glass lens. Optionally, the camera 118 further includes memory 306 storing instructions for execution by the controller 333.

The camera 118 determines (904) that the camera mode is a first mode in which the index of refraction of the electrochromic glass lens has a first index value associated with a first focal length. In accordance with a determination (906) that the camera mode at the first mode, the controller 333 generates (908) by the controller a first voltage, and applies (910) the first voltage on the electrochromic glass lens, thereby changing the index of refraction of the electrochromic glass lens to a second index value associated with a second focal length that is distinct from the first focal length.

In some implementations, it is determined that the camera mode is the first mode when ambient temperature of the camera exceeds a thermal threshold, and the first voltage is applied to compensate a variation of a focal length of either the electrochromic glass lens or one or more optical lens 452 of the lens assembly 333 that is caused by a corresponding temperature increase. This temperature increase often happens to an outdoor surveillance camera.

FIG. 10 is a flow diagram 1000 of a method of controlling a filtering effect of a camera (e.g., the camera 118 or 118) in accordance with some implementations. The camera 118 includes a controller 333 and an image sensor array 334 having a plurality of sensor elements, and a lens assembly 330 configured to focus light on the sensor array 334. Optionally, the camera 118 includes memory 306 storing instructions for execution by the controller 333. The lens assembly 330 includes an electrochromic glass layer 332 disposed in front of the sensor array and having optical transmission properties that are responsive to voltage applied to the electrochromic glass layer 332. The lens assembly includes a first filtering mode in which the electrochromic glass layer 332 is configured to band-transmit a first predefined band of wavelengths. More specifically, in accordance with a determination to transition the camera mode to an operation mode, the camera 118 (e.g., the mode control module 320*b*) determines (1004) a magnitude of a first voltage, and the controller 333 then generates the first voltage. In the operation mode, the camera 118 is configured (1006) to capture media content in a field of view illuminated with light having the first predefined band of wavelengths. The camera 452 then applies (1008) the first voltage to cause the lens assembly to enter the first filtering mode. In response to the first voltage, the electrochromic glass layer 332 passes (1010) a substantial portion of the first predefined band of wavelengths in the ambient light, thereby exposing the sensor array to the substantial portion of the first predefined band of wavelengths of the ambient light via the lens assembly. In some implementations, the first predefined band of wavelengths is associated with one of red, blue and green colors.

It should be understood that the particular order in which the operations in FIGS. 7-10 have been described are merely exemplary and are not intended to indicate that the described order is the only order in which the operations could be performed. One of ordinary skill in the art would recognize various ways to implement the respective methods 700, 800, 900 and 1000 as described herein. Additionally, it should be noted that details of a process described herein with respect to one of the methods 700, 800, 900 and 1000 are also applicable in an analogous manner to the other methods of the methods 700, 800, 900 and 1000. For brevity, the details of each method are not repeated for the other methods.

In summary, in accordance with various implementations in this application, nanoparticles are suspended in a crystal matrix to form an electrochromic glass layer that can switch between an IR blocking/filtering state and an IR transmission state without any moving part. A thin coating of nanocrystals embedded in glass can provide selective control over wavelengths of ambient light that can pass through the glass. A small jolt of electricity is needed to switch the electrochromic glass layer between the IR blocking/filtering state and the IR transmission state. Further, due to the use of the electrochromic glass layer in the optical path of a camera, the camera is configured for switching between a traditional visible light image capture mode and IR image capture mode, and this mode switching activity does not involve any moving part (such as a filter motor).

When the Nanocrystal-based electrochromic glass layer is used as an IR filter for a camera operating at Night and Day modes, it is compatible with many sensors that have greater dynamic range and sensitivity than an RGB-IR sensor.

More importantly, the electrochromic glass layer does not involve any moving parts and reduces space required by a camera module that relies on a mechanically driven filter. This helps improvement of the form factor of the camera module, and eliminates a risk of creating particle contamination in the camera module.

In some implementations, electrochromic filtering actually increases a dynamic range in Day mode by darkening in the visible range. This feature could be useful in outdoor imaging, where direct sunlight can saturate a sensor. Referring to FIG. 10, in some implementations, nanocrystals in the electrochromic glass layer can be tuned to specific wavelengths needs of the system.

Referring to FIG. 9, in some implementations, improvement to the technology allows a refractive index change in glass, and therefore, focal length compensation in a camera system (particularly in a fixed focus camera).

It will be understood that, although the terms first, second, etc. are, in some instances, used herein to describe various elements, these elements should not be limited by these terms. These terms are only used to distinguish one element from another. For example, a first voltage could be termed a second voltage, and, similarly, a second voltage could be termed a first voltage, without departing from the scope of the various described implementations. The first voltage and the second voltage are both voltage levels, but they are not the same voltage level.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A lens assembly configured to focus light on a sensor array of an optical device, comprising:
    one or more optical lenses; and
    an electrochromic layer positioned between the one or more optical lenses and the sensor array, the electrochromic layer having one or more optical properties that are responsive to voltage applied to the layer, including:
        a first optical property related to optical transmissivity having:
            a first state corresponding to a Day mode, responsive to a first applied voltage, in which the layer is substantially opaque to a predefined band of IR wavelengths; and
            a second state corresponding to a Night mode, responsive to a second applied voltage distinct from the first applied voltage, in which the layer is substantially transparent to the predefined band of IR wavelengths and visible wavelengths;
    wherein the optical device is configured to, in the Night mode:
        determine whether ambient light incident on the optical device is due to other than an IR light source;
        detect an ambient light level;
        based on a determination that the ambient light due to other than the IR light source and that the ambient light level exceeds a first lux threshold, initiate a mode change of the optical device to the Day mode; and
    based on a determination that the ambient light is due to other than the IR light source and that the ambient light threshold does not exceed the first lux threshold, maintain the optical device in the Night mode.

2. The lens assembly of claim 1, wherein the electrochromic layer includes an electrolyte layer, a first electrode, and a counter electrode.

3. The lens assembly of claim 2, wherein the first applied voltage and the second applied voltage are applied on the first electrode.

4. The lens assembly of claim 2, wherein the first electrode includes a layer of indium tin oxide (ITO) nanocrystals in glass made out of niobium oxide.

5. The lens assembly of claim 4, wherein the ITO nanocrystals are combined with niobium-containing ions (also called polyoxometalate (POM) clusters) in solution, and the first electrode is formed when the solution covers a surface of the electrochromic layer.

6. The lens assembly of claim 1, wherein the optical device further includes a controller, and the first applied voltage and the second applied voltage are supplied by the controller.

7. The lens assembly of claim 1, wherein the sensor array includes a plurality of sensor elements and is configured to capture images or video clips.

8. An optical device including a plurality of modes of operation, the optical device comprising:
    a controller;
    a sensor array; and
    a lens assembly that is configured to focus light on the sensor array, wherein the lens assembly includes one or more optical lenses and an electrochromic layer positioned between the one or more optical lenses and the sensor array, the electrochromic layer having one or more optical properties that are responsive to voltage applied to the layer, including:
        a first optical property related to optical transmissivity having:
            a first state corresponding to a Day mode, responsive to a first applied voltage supplied by the controller, in which the layer is substantially opaque to a predefined band of IR wavelengths in ambient light; and
            a second state corresponding to a Night mode, responsive to a second applied voltage supplied by the controller, in which the layer is substantially transparent to the predefined band of IR wavelengths and visible wavelengths;
    wherein the plurality of modes includes a third mode; and
    in accordance with a determination that the optical device is in the third mode, the controller supplies a third voltage that is substantially larger than the first voltage, the third voltage is applied on the electrochromic layer to cause the electrochromic layer to remove a substantial portion of the predefined band of IR wavelengths in ambient light incident on the optical device and reduce the intensity of visible wavelengths in the ambient light to a first visible light intensity, thereby exposing the sensor array to the visible wavelengths of the ambient light having the first visible light intensity.

9. The optical device of claim 8, wherein:
    the controller is configured to, in accordance with a determination to transition the optical device to the Day mode, supply the first voltage that is applied to the electrochromic layer; and
    the electrochromic layer is configured to, in response to the first voltage, exhibit the first state by removing a substantial portion of the predefined band of IR wavelengths in ambient light incident on the optical device and simultaneously passing a substantial portion of visible wavelengths in the ambient light, thereby exposing the sensor array to the substantial portion of the visible wavelengths of the ambient light via the lens assembly.

10. The optical device of claim 9, further comprising: one or more infrared light emitting diodes that are powered on to illuminate a field of view in accordance with the determination to transition the optical device to the Night mode of operation.

11. The optical device of claim 8, wherein the third mode includes a high dynamic range (HDR) mode, and the optical device is configured to:
    capture a first image when the first voltage is applied on the electrochromic layer;
    capture a second image when the third voltage is applied on the electrochromic layer; and
    combine at least the first and second images to obtain a HDR image.

12. The optical device of claim 8, wherein the third mode includes a high dynamic range (HDR) mode, and the optical device is configured for:
- supplying by the controller a fourth voltage that is distinct from the third voltage;
- applying the fourth voltage on the electrochromic layer;
- in response to the fourth voltage, removing by the electrochromic layer a substantial portion of the predefined band of the wavelengths while reducing the intensity of the visible wavelengths in the ambient light to a second visible light intensity;
- capturing a first image when the third voltage is applied on the electrochromic layer;
- capturing a second image when the fourth voltage is applied on the electrochromic layer; and
- combining at least the first and second images to obtain a HDR image.

13. The optical device of claim 9, wherein the optical device is configured for:
- in the Night mode:
  - determining whether the ambient light is due to other than an IR light source;
  - detecting an ambient light level;
  - based on a determination that the ambient light that is not filtered by the electrochromic layer is due to other than the IR light source and that the ambient light level exceeds a first lux threshold, initiating a mode change of the optical device to the Day mode;
  - based on a determination that the ambient light is due to other than the IR light source and that the ambient light threshold does not exceed the first lux threshold, maintaining the optical device in the Night mode.

14. The optical device of claim 13, wherein the sensor array includes a plurality of sensor elements, the sensor elements include first, second and third pixels, each having respective peak responses at different respective visible light frequencies, and determining whether the ambient light is due to other than the IR light source further includes:
- detecting a first light component of the ambient light by averaging output signals from the first pixels;
- detecting a second light component of the ambient light by averaging output signals from the second pixels;
- detecting a third light component of the ambient light by averaging output signals from the third pixels; and
- determining based on respective values of the first, second and third light components whether the ambient light is due to other than the IR light source.

15. A method performed
at an optical device having a controller, a sensor array, and a lens assembly that is configured to focus light on the sensor array, wherein the optical device includes a plurality of modes of operation, the modes of operation including a Day mode, a Night mode, and a third mode, and wherein the lens assembly includes one or more optical lenses and an electrochromic layer positioned between the one or more optical lenses and the sensor array, the electrochromic layer having one or more optical properties that are responsive to voltage applied to the layer, including a first optical property related to optical transmissivity, the method comprising:
- responsive to an instruction to initiate the Day mode of operation:
  - supplying by the controller a first voltage; and
  - applying the first voltage to the electrochromic layer to cause the electrochromic layer to exhibit a first state of the first optical property, in which the layer is substantially opaque to a predefined band of IR wavelengths in ambient light;
- responsive to an instruction to initiate the Night mode of operation:
  - supplying by the controller a second voltage; and
  - applying the second voltage to the electrochromic layer to cause the electrochromic layer to exhibit a second state of the first optical property, in which the layer is substantially transparent to the predefined band of IR wavelengths and visible wavelengths; and
- in accordance with a determination that the optical device is in the third mode:
  - supplying by the controller a third voltage that is substantially larger than the first voltage, the third voltage is applied on the electrochromic layer to cause the electrochromic layer to remove a substantial portion of the predefined band of IR wavelengths in ambient light incident on the optical device and reduce the intensity of visible wavelengths in the ambient light to a first visible light intensity, thereby exposing the sensor array to the visible wavelengths of the ambient light having the first visible light intensity.

16. The method of claim 15, wherein
the first applied voltage causes the electrochromic layer to exhibit the first state by removing a substantial portion of the predefined band of IR wavelengths in ambient light incident on the optical device and simultaneously passing a substantial portion of visible wavelengths in the ambient light, thereby exposing the sensor array to the substantial portion of the visible wavelengths of the ambient light via the lens assembly.

17. The method of claim 15, wherein
the second applied voltage causes the electrochromic layer to exhibit the second state by becoming substantially transparent to the predefined band of IR wavelengths, thereby exposing the sensor array to both the predefined band of IR wavelengths and a substantial portion of the visible wavelengths of the ambient light via the lens assembly.

18. The method of claim 15, wherein the first applied voltage has a magnitude not greater than 5 V and the second applied voltage is substantially equal to zero.

* * * * *